United States Patent
Bellini, III et al.

(10) Patent No.: US 8,996,642 B1
(45) Date of Patent: Mar. 31, 2015

(54) SYSTEMS AND METHODS FOR PRIORITIZING AND SERVICING SUPPORT TICKETS USING A CHAT SESSION

(71) Applicant: ConnectWise Inc., Tampa, FL (US)

(72) Inventors: Arnold Bellini, III, Tampa, FL (US); Linda Brotherton, Tampa, FL (US)

(73) Assignee: ConnectWise Inc., Tampa, FL (US)

( * ) Notice: Subject to any disclaimer, the term of this patent is extended or adjusted under 35 U.S.C. 154(b) by 0 days.

(21) Appl. No.: 14/554,963

(22) Filed: Nov. 26, 2014

Related U.S. Application Data

(63) Continuation of application No. 14/336,705, filed on Jul. 21, 2014, now Pat. No. 8,903,933.

(51) Int. Cl.
- *G06F 15/16* (2006.01)
- *H04L 29/08* (2006.01)
- *H04N 21/4788* (2011.01)

(52) U.S. Cl.
CPC ...... *H04L 29/08837* (2013.01); *H04N 21/4788* (2013.01)
USPC ........... 709/206; 709/218; 709/224; 709/246; 707/705

(58) Field of Classification Search
CPC ..................... H04L 29/08837; H04N 21/8173; H04N 21/4788
USPC ........................................................ 709/206
See application file for complete search history.

(56) References Cited

U.S. PATENT DOCUMENTS

| | | | |
|---|---|---|---|
| 6,177,932 B1 | 1/2001 | Galdes et al. | |
| 6,389,132 B1 | 5/2002 | Price | |
| 7,415,417 B2 | 8/2008 | Boyer et al. | |
| 7,472,166 B1 | 12/2008 | Davis | |
| 7,603,625 B2 | 10/2009 | Guillermo et al. | |
| 7,657,605 B2 | 2/2010 | Blohm | |
| 7,787,609 B1 | 8/2010 | Flockhart et al. | |
| 7,933,815 B2 | 4/2011 | Hutty et al. | |

(Continued)

FOREIGN PATENT DOCUMENTS

WO  WO-01/27847  4/2001

OTHER PUBLICATIONS

Bomgar, ServiceNow Remote Support and Chat Integration, frames from video on company web site, Dec. 8, 2011, Ridgeland, Mississippi.

(Continued)

*Primary Examiner* — Arvin Eskandarnia
(74) *Attorney, Agent, or Firm* — John D. Lanza; Foley & Lardner LLP

(57) ABSTRACT

The present disclosure facilitates servicing information technology support tickets. In some embodiments, the system includes a server configured to access a database storing two support tickets, each of which can have a ticket identifier and information to facilitate providing information technology support to a computing device. The server can receive an indication of a status from two computing devices, each of which can be associated with one of the support tickets. The server can determine a priority of each ticket based on its status, where the priority of the first ticket is higher than the priority of the second ticket. The server can initiate a chat session associated with the first computing device and the first ticket to provide information technology support to the first computing device, based on the priority of the first ticket and the status of the first computing device.

30 Claims, 40 Drawing Sheets

(56) References Cited

U.S. PATENT DOCUMENTS

| | | | |
|---|---|---|---|
| 7,987,275 B2 | 7/2011 | Shae et al. | |
| 7,992,145 B2* | 8/2011 | Emerson et al. | 718/100 |
| 8,135,612 B1 | 3/2012 | Scudder | |
| 8,345,854 B2 | 1/2013 | Shaffer et al. | |
| 8,589,489 B2 | 11/2013 | Bomgaars et al. | |
| 8,595,321 B2 | 11/2013 | Hoang | |
| 8,600,035 B2 | 12/2013 | Jay et al. | |
| 8,666,921 B2 | 3/2014 | Fisher, Jr. | |
| 8,667,059 B2 | 3/2014 | Singh et al. | |
| 2001/0054064 A1 | 12/2001 | Kannan | |
| 2007/0094661 A1 | 4/2007 | Baird et al. | |
| 2007/0294368 A1 | 12/2007 | Bomgaars et al. | |
| 2009/0043669 A1 | 2/2009 | Hibbets et al. | |
| 2009/0063175 A1 | 3/2009 | Hibbets et al. | |
| 2010/0094836 A1* | 4/2010 | Duncan et al. | 707/705 |
| 2010/0223190 A1 | 9/2010 | Pedersen et al. | |
| 2012/0101866 A1* | 4/2012 | Magnuson | 705/7.13 |
| 2012/0215767 A1 | 8/2012 | Myer et al. | |
| 2012/0254381 A1 | 10/2012 | Rodrigues | |
| 2012/0323623 A1 | 12/2012 | Sabharwal | |
| 2013/0018803 A1 | 1/2013 | Challu | |
| 2013/0031481 A1 | 1/2013 | Schreifels | |
| 2013/0055113 A1 | 2/2013 | Chazin et al. | |
| 2013/0282725 A1 | 10/2013 | Rubinger | |
| 2013/0332537 A1 | 12/2013 | Emerick et al. | |
| 2014/0040397 A1 | 2/2014 | Bomgaars et al. | |
| 2014/0081875 A1 | 3/2014 | Pierson et al. | |
| 2014/0123180 A1 | 5/2014 | Xiao et al. | |
| 2014/0249888 A1* | 9/2014 | Palestrant et al. | 705/7.31 |

OTHER PUBLICATIONS

Bomgar, ServiceNow Remote Support and Chat Integration, from company web site, captured Jun. 21, 2014, Ridgeland, Mississippi.
Buecker, Axel, Bo Batty, Jason Brown, Alex Chung, Samuel Hokama, Aurelien Jarry, Leonardo Matos, and Daniel Wiegand, IT Service Management Best Practices Using IBM SmartCloud Control Desk, First Edition, Dec. 2013, IBM Redbooks, Armonk, New York.
Citrix, Citrix GoToAssist Delivers "One-Stop Shop" for IT Support, press release from company web site, Oct. 17, 2012, Santa Clara, California.
Citrix, Introducing GoToAssist Service Desk, frames from YouTube video, Oct. 17, 2012, Santa Clara, California.
Dameware, a SolarWinds company, Chat with End-Users & Capture Remote Screenshots, excerpt from company web site, captured Jun. 22, 2014, Austin, Texas.
DeskDirector, Chat With Your Clients, product description from company web site, captured Jul. 13, 2014, Auckland, New Zealand.
DeskDirector, Watch a Demo, frames from video on company web site, Dec. 11, 2013, Auckland, New Zealand.
GFI Max, a GFI Software company, Remote Command Line—GFI Max RemoteManagement—[Product Series], frames from YouTube video, Sep. 6, 2013, Durham, North Carolina.
Kaseya, Asset Management—Remote Control, page from company web site, captured Jun. 22, 2014, Jersey, British Isles.
Kaseya, Live Connect Video Chat, image from company web site, captured Jun. 22, 2014, Jersey, British Isles.
LogMeIn, About Instant Chat, page from company web site, web page dated 2013, captured Jun. 22, 2014, Boston, Massachusetts.
LogMeIn, Integration of Rescue and Zendesk, page from company web site, web page dated 2013, captured Jun. 22, 2014, Boston, Massachusetts.
ManageEngine, a division of Zoho Corp., Live Chat in ServiceDesk Plus on Demand, online documenation site, captured Jul. 13, 2014, Pleasanton, California.
ManageEngine, a division of Zoho Corp., New Feature—Live Chat Integration, page from company web site, Feb. 5, 2014, Pleasanton, California.
Mason, Jeff, "Deep Integration" & The Meaning of "Great", blog entry on Velaro company web site, May 20, 2014, Elkridge, Maryland.
Microsoft Corporation, Microsoft System Center—Remote Tools, online product documentation, captured Jun. 21, 2014, Redmond, Washington.
N-able, a SolarWinds company, What's New in N-central 8.0, frames from YouTube video, Apr. 29, 2011, Ottawa, Ontario, Canada.
Notice of Allowance on U.S. Appl. No. 14/336,705 dated Oct. 22, 2014.
NTRglobal, an ASG company, ConnectWise Rolls out Chat, Remote Control for enhanced help desk support and service ticketing, press release from company web site, undated, captured Jun. 22, 2014, Barcelona, Spain.
NTRglobal, an ASG company, NTR Chat, product description from company web site, web page dated 2012, captured Jun. 21, 2014, Barcelona, Spain.
NTRglobal, an ASG company, Partners—ConnectWise integration, frames from video on company web site, web page dated 2012, captured Jun. 22, 2014, Barcelona, Spain.
RealVNC, VNC User Guide, Version 5.2, Jun. 2014, Cambridge, United Kingdom.
Rodriguez Puertas, Alexandre, The introduction of a ticket system for a professional business to business support center, Master's thesis, Universitat Politecnica de Catalunya, Jun. 6, 2011, Barcelona, Spain.
ServiceNow, Chat, online product documentation, Feb. 13, 2014, Santa Clara, California.
ServiceNow, Using Chat, online product documentation, Jun. 11, 2014, Santa Clara, California.
ServiceNow, Using Help Desk Chat, online product documentation, Oct. 15, 2012, Santa Clara, California.
Shae, Zon-Yin et al., Efficient Internet Chat Services for Help Desk Agents, 2007 IEEE International Conference on Services Computing, Jul. 9, 2007, New York, New York.
SysAid, Live Chat, page from company web site, captured Jun. 22, 2014, Airport City, Israel.
SysAid, Service Desk, images from online product documentation, Mar. 23, 2014, Airport City, Israel.
SysAid, Ticket Management, page from company web site, captured Jun. 22, 2014, Airport City, Israel.
TeamViewer GmbH, TeamViewer 9 Manual—Remote Control, Rev 9.1-12/2013, Dec. 2013, Goppingen, Germany.
UltraVNC, UltraVNC Chat, page from organization web site, captured Jun. 21, 2014, Bergschenhoek, Netherlands.
Yan, Steven, Setting up and using Zendesk with LogMeIn Rescue, blog entry on Zendesk company web site, Sep. 13, 2010, San Francisco, California.

* cited by examiner

SYSTEMS AND METHODS FOR PRIORITIZING AND SERVICING SUPPORT TICKETS USING A CHAT SESSION

CROSS REFERENCES TO RELATED APPLICATIONS

This application claims the benefit of priority under 35 U.S.C. §120 as a continuation of U.S. patent application Ser. No. 14/336,705, filed Jul. 21, 2014, which is incorporated by reference herein in its entirety.

FIELD OF THE DISCLOSURE

The present disclosure generally relates to customer support tickets. More specifically, the present disclosure relates to prioritizing support tickets and initiating a chat session.

BACKGROUND OF THE INVENTION

Customers of information technology services may encounter problems related to an information technology service or product, or make requests for a service or product. Customers may contact a provider of the information technology services to address the problems or requests. The provider may create tickets to organize and facilitate addressing the customers' problems and requests. As providers of information technology services receive numerous requests from various customers, it may be challenging to provide support for the customers.

SUMMARY OF THE INVENTION

A company may want to provide customer support to customers to facilitate resolving problems. These problems may involve any aspect of the business of the customer. For example, a customer may need help to fix a hardware failure, use a software application, configure a software service, understand an invoice, or track down a missing shipment. The company may choose to use a software application designed for customer support to facilitate the support process.

The customer support application may include a ticketing system. In a ticketing system, a customer can enter a request for help. The request can be stored in a ticket, and the ticket can be used to track the status of the help request until it is solved. The tickets can be organized on service boards where they may be more visible to support managers and support agents. The tickets on service boards can be prioritized based on various criteria; for example, tickets that stop work may have highest priority. There can be multiple service boards and the assignment of tickets to service boards can be based on other criteria; for example, one service board may contain tickets concerning hardware problems and another service board may contain tickets concerning software problems. In this way, support agents can address service boards based on their expertise in certain areas.

Support agents may be able to resolve some problems without involving a customer, but they may need to interact with a customer in order to solve a problem. A support agent can interact with a customer using email or phone. However, this can introduce delay in the form of waiting for emails or playing "phone tag", which may cause customers to get frustrated if they want quick service. In addition, phone service may be inefficient for a support agent, because it can force the support agent to work with one customer at a time, and spend time waiting for the customer to perform actions requested by the support agent. Although a customer may enjoy the personalized attention of a phone call, overall satisfaction may be decreased as customers are forced to wait for their phone calls to be taken in turn.

Chat systems, also known as instant messaging (IM) systems, can help to address these inefficiencies. Support agents can use chat systems to give personalized attention to more than one customer at the same time. When the support agent is waiting for one customer to perform an action, he or she may be able to continue to interact with another customer. In addition, the chat system may show the presence or absence of users in the chat system, so the overhead of trying to communicate with a customer who is away can be avoided.

However, it may be difficult and inconvenient for the support agent to use a chat tool that is completely separate from the ticketing system. The support agent would like to have chat features integrated into service boards and tickets. The present disclosure describes methods and systems for integrating a chat system into a ticketing system.

At least one aspect of the present disclosure is directed to a system for facilitating servicing information technology support tickets. In some embodiments, the system includes a computer network and a server. The server can be configured to access a database storing two support tickets, each of which can have a ticket identifier and information to facilitate providing information technology support to a computing device. The server can be configured to receive an indication of a status from two computing devices, each of which can be associated with one of the support tickets. The server can be configured to determine a priority of each ticket based on its status, where the priority of the first ticket is higher than the priority of the second ticket. The server can be configured to initiate a chat session associated with the first computing device and the first ticket to provide information technology support to the first computing device, based on the priority of the first ticket and status of the first computing device.

In some embodiments, the server is further configured to provide, for display on a third computing device via a user interface, a representation of the first support ticket, the second support ticket, the first status, and the second status. The server can be configured to receive, from the third computing device via the user interface, an indication to start a second chat session associated with the first computing device and the third computing device to provide information technology support to the first computing device. The server can be configured to initiate, responsive to the indication, the second chat session.

In some embodiments, the server is further configured to modify, responsive to input from a third computing device, the first support ticket. The first support ticket can further include a first ticket status, and the modification can modify the first ticket status to indicate a closed status. The server can terminate the chat session responsive to the modification.

In some embodiments, the server is further configured to provide, for display via a user interface, responsive to input from a third computing device, a representation of the first support ticket and a representation of the chat session. The user interface can comprise a support ticket interface and a chat interface.

In some embodiments, the server is further configured to identify an occurrence of an activity detected via a peripheral including at least one of a mouse, a keyboard, a microphone, a camera, a touch screen, a proximity sensor, a motion sensor, an a third computing device. The occurrence of the activity can be associated with a time stamp. The server can be configured to identify a current time of day. The server can be configured to determine, based on the time stamp and the current time, a length of time since the occurrence of the activity. The server can be configured to determine the first indication of the first status based on the length of time since the occurrence of the activity detected via the peripheral.

In some embodiments, the server is further configured to receive, from the first computing device, based on input from a user interface, a third indication of a change of the first status. The server can be configured to modify, responsive to the third indication, the first status.

In some embodiments, the server is further configured to determine the first indication of the first status based on a current time of day.

In some embodiments, the server is further configured to receive, from the second computing device, a third indication of a third status of the second computing device. The server can be configured to determine a third priority of the second support ticket based on the third status. The third priority can be higher than the first priority. The server can be configured to initiate, based on the third priority and the third status, a second chat session associated with the second support ticket and the second computing device to provide information technology support to the second computing device.

In some embodiments, the server is further configured to receive, from a third computing device, based on input from a first user interface, a third indication to start a first remote control session associated with the first computing device and the third computing device to provide information technology support to the first computing device. The server can be configured to initiate, responsive to the third indication, the first remote control session.

In some embodiments, the server is further configured to receive, from the third computing device, based on input from a second user interface, a fourth indication to start a second remote control session associated with the second computing device and the third computing device to provide information technology support to the second computing device. The server can be configured to initiate, responsive to the fourth indication, the second remote control session.

In some embodiments, the server is further configured to determine a count of chat sessions associated with a third computing device. The server can be configured to increment the count, responsive to receiving an indication to initiate an additional chat session. The server can be configured to prevent initiation of the additional chat session, responsive to the count exceeding a threshold.

In some embodiments, the server is further configured to determine a count a chat sessions associated with a third computing device. The server can be configured to increment the count, responsive to the initiating the chat session. The server can be configured to receive, from the first computing device associated with the first support ticket, a third indication of the first status of the first computing device. The server can be configured to determine a third priority of the first support ticket based on the first status. The third priority can be higher than the second priority. The server can be configured to prevent, responsive to the incrementing, based on the count exceeding a threshold, a chat session associated with the first support ticket and the first computing device.

In some embodiments, the server is further configured to identify the first support ticket. The first support ticket can further comprise a first plurality of descriptive fields. The server can be configured to identify the second support ticket. The second support ticket can further comprise a second plurality of descriptive fields. The server can be configured to determine the first priority of the first support ticket based on the first status and the first plurality of descriptive fields, and the second priority of the second support ticket based on the second status and the second plurality of descriptive fields.

In some embodiments, the server is further configured to identify a first plurality of session fields associated with the first computing device. The server can be configured to identify a second plurality of session fields associated with the second computing device. The server can be configured to determine the first priority of the first support ticket based on the first status and the first plurality of session fields, and the second priority of the second support ticket based on the second status and the second plurality of session fields.

In some embodiments, the server is further configured to receive, based on the first ticket identifier, a plurality of descriptive fields. The server can be configured to provide, for display via a user interface, responsive to the receiving the plurality of descriptive fields via the user interface, a representation of the first support ticket and a representation of the plurality of descriptive fields. The user interface can comprise a support ticket interface.

In some embodiments, the server is further configured to receive, from a third computing device, based on input from a first user interface, a third indication to start a second chat session associated with the first support ticket, the first computing device, the third computing device, and a fourth computing device to provide information technology support to the first computing device. The server can be configured to initiate, responsive to the third indication, the second chat session.

In some embodiments, the server is further configured to receive, from the fourth computing device, based on input from a second user interface, a fourth indication to remove the association of the second chat session and the third computing device. The server can be configured to remove, responsive to the fourth indication, the association of the second chat session and the third computing device.

In some embodiments, the server is further configured to receive, from a third computing device, based on input from a user interface, a third indication to start a second chat session associated with the third computing device. The server can be configured to initiate, responsive to receiving the third indication, the second chat session.

In some embodiments, the server is further configured to identify a third support ticket having a third ticket identifier and a fourth support ticket having a fourth ticket identifier. The third support ticket and fourth support ticket can have information to facilitate providing information technology support to the first computing device. The server can be configured to receive, from a third computing device associated with the third support ticket, a third indication of a third status of the third computing device. The server can be configured to receive, from a fourth computing device associated with the fourth support ticket, a fourth indication of a fourth status of the fourth computing device. The server can be configured to determine a third priority of the third support ticket based on the third status, and a fourth priority of the fourth support ticket based on the fourth status. The third priority can be higher than the fourth priority. The server can be configured to initiate, via the computer network, based on the third priority and the third status, a second chat session associated with the third support ticket, the third computing device, and the first computing device to provide information technology support to the first computing device.

In some embodiments, the server is further configured to receive, from the first computing device, based on the fourth priority and the fourth status, a fifth indication to start a third chat session associated with the second support ticket, the fourth computing device, and the first computing device to provide information technology support to the first computing device. The server can be configured to initiate, responsive to receiving the fifth indication, the third chat session.

At least one aspect is directed to a method of servicing information technology support tickets via a computer network. The method can include a server accessing a database that stores a first support ticket and a second support ticket in memory. The first support ticket can have a first ticket identifier and the second support ticket can have a second ticket identifier. The first support ticket can have information to facilitate providing information technology support to a first computing device. The second support ticket can have information to facilitate providing information technology support to a second computing device. The method can include the server receiving a first indication of a first status of the first computing device from the first computing device. The method can include the server receiving a second indication of a second status of the second computing device from the second computing device. The method can include the server determining a first priority of the first support ticket based on the first status and a second priority of the second support ticket based on the second status. The first priority can be higher than the second priority. The method can include the server initiating a chat session via the computer network, associated with the first support ticket and the first computing device, to provide information technology support to the first computing device.

At least one aspect is directed to a non-transitory computer readable medium storing instructions that, when executed by one or more processors, facilitate servicing information technology support tickets via a computer network. The instructions can include instructions to access a database storing two support tickets, each of which can have a ticket identifier and information to facilitate providing information technology support to a computing device. The instructions can include instructions to receive an indication of a status from two computing devices, each of which can be associated with one of the support tickets. The instructions can include instructions to determine a priority of each ticket based on its status, where the priority of the first ticket is higher than the priority of the second ticket. The instructions can include instructions to initiate a chat session associated with the first computing device and the first ticket to provide information technology support to the first computing device, based on the priority of the first ticket and status of the first computing device.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
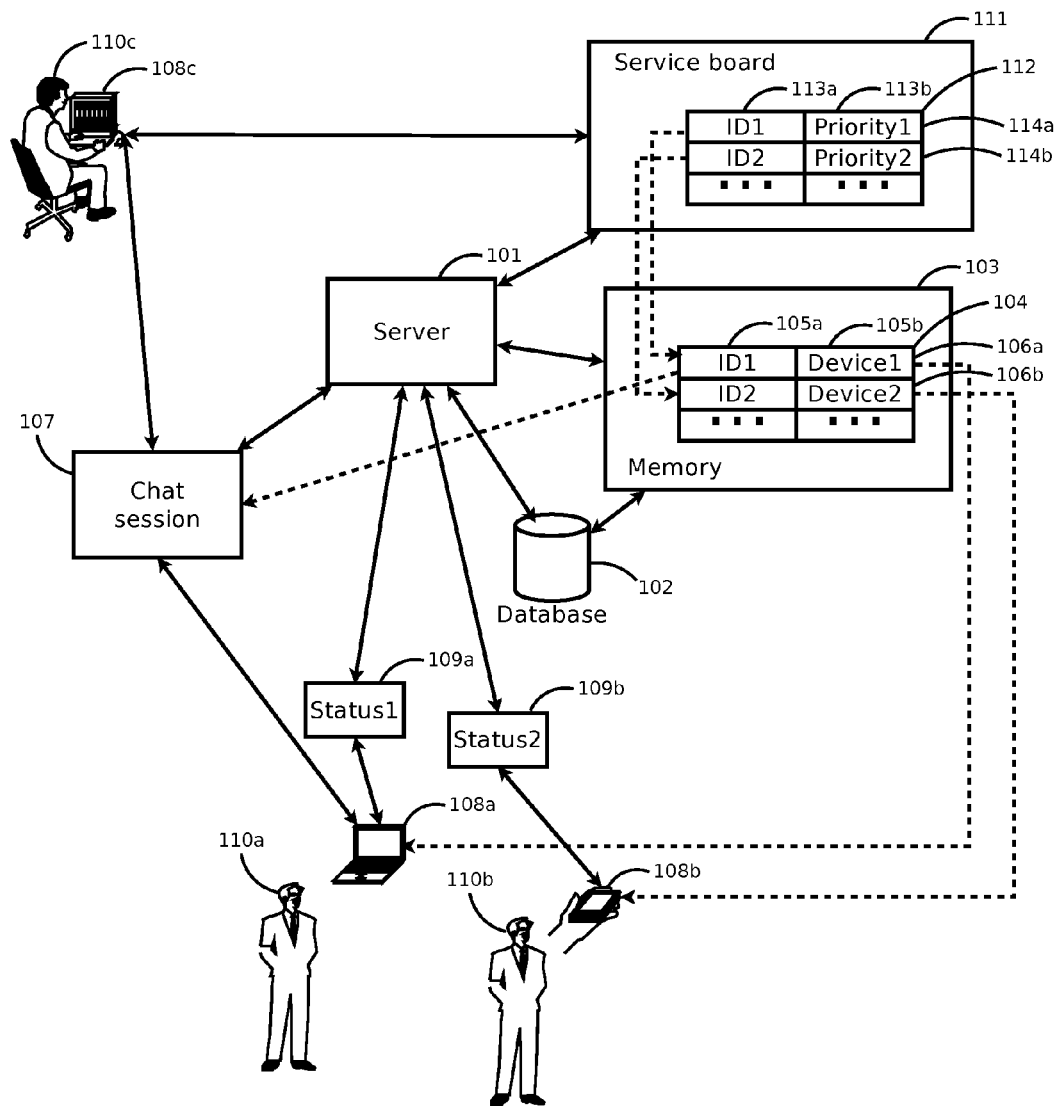
FIG. 1 is an illustrative block diagram of an embodiment of a system for prioritizing and servicing support tickets using a chat session.

Systems and methods of the present disclosure can facilitate servicing information technology support tickets. The system can include a server, which can provide a ticketing system. Support agents and customers can use computing devices to access the ticketing system. The ticketing system can use a database to store tickets and information about them. The system can contain a computer network, which can serve to connect the server and the computing devices, as well as other components in the system.

The ticketing system can be used to manage support incidents by associating a ticket with each support incident. A ticket can be created when a support incident is reported. For example, a support agent can create a ticket in response to a phone call from a customer reporting a problem. In another example, a customer can create a ticket in order to report a support incident. Support incidents may involve any aspect of the business of the customer. For example, a customer may need help to fix a hardware failure, or help to use a software application, or help to configure a software service, or help to understand an invoice, or even help to track down a missing shipment.

The ticket can store multiple fields of information about the support incident. For example, the ticket can store the company name for the customer, the contact name for the customer, the phone number for the customer, the email address for the customer, a site name for the customer, the address for the customer, the service agreement for the customer, a sales opportunity being pursued, the deadline for the ticket, the service level agreement (SLA) for the ticket, the ticket status, the class of service applied to the ticket, the way the ticket was originally entered, the person who originally entered the ticket, the severity of the ticket, the impact of the ticket, the time budgeted for the ticket, a summary of the issue, a detailed description of the issue, the history of the ticket so far, internal notes about the ticket, the account manager for the customer, or any other information related to the support incident.

The ticket can store a ticket status. This can help to manage the life cycle of the ticket. For example, when the ticket is first created, it can have a ticket status of "new". When the support agent starts working on the support incident described by the ticket, the status can be changed to "processing". If the support agent asks the customer for more information, or asks the customer to make a change, the ticket status can be changed to "waiting". When the support incident is resolved, the ticket status can be changed to "closed". If it is discovered that the support incident has not been fully resolved, the ticket status can be changed to "reopened". In this way, the ticket status can be used to facilitate routing the ticket to the attention of the right individual, and can also be used to track the progress of the solution of the support incident.

Service boards can be used to manage groups of tickets. A service board can show a group of tickets, showing a summary of each ticket in the group. The tickets on a service board can be selected, ordered, and segmented based on the fields in the tickets. For example, one service board can select all tickets with a ticket status of "new", order the tickets by the ticket creation time, oldest first, and segment the tickets by the class of service the customer has purchased. In this way, this service board can be used to monitor new support issues from the most important customers, and help to address the ones first that have been outstanding the longest time. In another example, a service board can select all tickets that are assigned to a certain support agent and order them by the priority that has been assigned to the ticket. In this way, the support agent can use this service board to quickly decide on which ticket (and which support issue) to work on next.

The ticketing system can maintain an association between a ticket and the computing device of the customer that reported the support incident. For example, if a customer created the ticket initially, the computing device that was used to create the ticket can be associated with the ticket. The computing device can have a status associated with it. For example, the status may have one of the values "offline", indicating that the computing device is not connected to the server, or that the customer is not currently using the computing device, "away", indicating that the customer is using the computing device but has stepped away to do something else, "do not disturb", indicating that the customer is currently using the computing device but does not wish to be interrupted, and "available", indicating that the customer is using the computing device and is willing to be interrupted and communicate with a support agent.

A chat agent can be installed on the computing device. For example, the server may provide a chat agent to the computing device and further instruct the computing device to install the chat agent. In some embodiments, the server may provide notifications, prompts, or other user interface elements to the computing device in order to install the chat agent, or launch the chat agent. In some embodiments, upon installation of the chat agent, the chat agent may be configured to automatically launch upon startup of the computing device or launch responsive to an indication, such as an indication to launch from a user of the computing device or from the server. The server and chat agent can determine the status of the computing device. For example, the status may be set to "offline" if there is no connection between the computing device and the server. In another example, the status may be set to "away" if the chat agent determines that the mouse and keyboard on the computing device have not been used in the past five minutes. In another example, the status may be set to "do not disturb" if the server determines that the customer associated with the ticket is using a voice-over-IP (VOIP) telephone service on the server to make a phone call. In another example, the status may be set to "available" if the chat agent determines that the mouse or keyboard on the computing device have been used in the past five minutes.

The status of the computing device may be used as one of the criteria for selecting, ordering, and segmenting tickets on a service board. For example, a service board can place a ticket first when the status of the computing device associated with the ticket is set to "available". In this way, the service board may facilitate finding tickets for which it is easy to communicate with the customer that is affected by the support issue.

The chat agent may facilitate the creation of a chat session between a support agent and a customer. The support agent can be an individual who is using a computing device to work with a customer to help address the support issue. In a chat session, a separate window can be created on the computing devices of the support agent and the customer. The separate window can allow both participants to type messages to each other, and can display a record of the messages over time. The chat agent may also facilitate the creation of a remote control session, in which the support agent can monitor the outputs of the computing device of the customer, such as the screen and the audio output, and can temporarily take control of the input devices on the computing device of the customer, such as a mouse and keyboard. In this way, the support agent may be able to work on the support incident more efficiently.

The chat agent may allow the customer to sign in using authentication credentials such as a user name and password. In this way, the chat agent may be able to display a service board to the customer. The customer service board can be configured to show the tickets associated with the customer, which may allow the customer to check on the status of the tickets or update the tickets as desired.

The service boards may be configured to start a chat session associated with a ticket on the service board. Both the service boards used by the support agent and the service board shown to the customer can be configured to start chat sessions in this way. When a service board is used to start a chat session, the chat session can display the chat transcript along with the ticket, and can facilitate updating the ticket during the duration of the chat session. This may facilitate the resolution of support incidents that require attention over a longer period of time, or that require attention by more than one support agent, by making information about the support incident more easily available.

Using chat sessions to support customers may facilitate the efficiency of a support agent by allowing the support agent to work with more than one customer at the same time. For example, if the support agent is resolving a billing issue with one customer that requires the customer to verify a copy of an invoice, then the support agent can work with another customer on a software installation issue while the first customer goes to find the invoice. The support management may wish to set a limit on the maximum number of simultaneous chat sessions that a support agent will have, in order to prevent a degradation of the quality of the service seen by customers. For example, the management may set a limit of three chat sessions for one support agent. The system can then prevent additional chat sessions from being opened with that support agent once the limit of three has been reached.

A chat session may include more participants than one support agent and one customer. For example, a first support agent may discover that the support incident involves specialized knowledge that would be better addressed by a second support agent who is a local expert in that specialized knowledge. The first support agent may decide to bring the second support agent into the support incident, and may add the second support agent to the chat session, which can now be associated with the customer, the first support agent, and the second support agent. The chat session may support all three participants seeing every message. The chat session may also support private messages between the first support agent and the second support agent, so that the customer does not see these messages. The chat session may support the first support agent turning the ticket over to the second support agent, so that the ticket is updated to show that the second support agent is managing the ticket, and the first support agent is leaving the chat session. It should be understood that the chat session can support multiple support agents and multiple customers as needed in order to address the support incident.

The ticketing system may display information about the support incident in addition to the information that is contained in the ticket. For example, the company may have a monitoring system in place that records information about the computing devices and their activity. The ticketing system may be able to access the monitoring information about the computing device associated with the ticket, and may be able to display that monitoring information along with the ticket.

The ticketing system can use queues to facilitate support agents in addressing support incidents. The queues can be given names that generally correspond with a class of support incident, for example, a queue may have the name "billing", indicating that it is intended for billing questions and issues, and another queue may have the name "hardware", indicating that it is intended for issues with hardware components such as machines, networking equipment, and displays. A queue can be associated with a service board, which may indicate that creating a ticket associated with the queue will also associate it with the service board, which can cause it to be displayed on the service board. A support agent can be associated with one or more queues, which may indicate that the support agent is available to work on tickets associated with those queues.

The ticketing system can have workflow rules that can automate ticket processing. A workflow rule can have a set of criteria to select a set of tickets, and can have a set of actions to take on the selected tickets. For example, a workflow rule can select tickets that have had the "new" status for longer than one hour, and the action can be to change the service board associated with the ticket to a "late" service board and send an alert email to a set of service managers. The service managers may monitor the "late" service board and allocate resources as needed to help ensure that the company responds to customer requests in a timely way.

In an illustrative example, a customer may create a ticket for a support incident late at night, but may then decide to go home due to the late hour. The next day, the ticket may be on a service board, but may be at a low priority because the customer is not present, as determined by the chat agent and the server. When the customer comes in and starts using the computing device, the chat agent may change the status of the computing device to "available", which may increase the priority of the ticket, which in turn may move the ticket to the top of the service board, which may in turn cause a support agent to start working on the ticket. The support agent may change the ticket status to "processing" and review the ticket. The support agent may decide to start a chat session with the customer. The support agent can already have a good deal of information about the support incident, which can facilitate giving the customer confidence and satisfaction with the process. The support agent may ask the customer a few questions to get some more information, may discover as a result that more research is required to solve the support incident, and can inform the customer of the status.

Later, the support agent may find the solution for the support incident and add it to the ticket, but may discover that the status for the computing device of the customer has changed to "away". The support agent can decide to leave the ticket for later, and the ticket may fall in priority on the service board as a result of the "away" status.

Still later, the customer may return, and as a result, the status of the customer's computing device may change to "available". This may increase the priority of the ticket on the service board. Another support agent may see the service ticket and may decide to work on the support incident. The second support agent can see the history of the support incident, and can also see the solution that the first support agent added to the ticket. The support agent may open a chat session with the customer, inform the customer of the solution, help the customer apply the solution, and verify that the support incident has been addressed. The support agent may then close the ticket by setting the ticket status to "closed". This may terminate the chat session with the customer.

In this example, the support agents can work with multiple customers at the same time because the context for each support incident is stored in the ticket that is associated with the chat session, and the display of the chat session can have the display of the ticket associated with it.

In another illustrative example, the customer may believe that an invoice has been overcharged, and can enter a ticket in a queue for "accounting", asking for the itemized invoice.

A support agent may investigate the incident and discover that he needs to wait for the purchasing department to find out some information on the price of a part that was ordered. As a result, the support agent may add this request to the ticket and assign the ticket to the purchasing department. Later, the customer may want to find out what is going on, so the customer can look at a service board with all of his tickets, and can select this ticket from it and start a chat session from the ticket. The chat request can be routed to a support agent that is familiar with purchasing, based on the information in the ticket. As a result, the company can handle the ticket efficiently, and the customer can get a status update more efficiently.

Turning to the figures, FIG. 1 is an illustrative block diagram of an embodiment of a system for prioritizing and servicing support tickets using a chat session. The server 101 can access the database 102 and retrieve, into memory 103, a list 104 of support tickets 106*a*, 106*b*, and so on. Each support ticket 106*a-b* can have an identifier 105*a* and an association 105*b* to a computing device. For example, in the embodiment depicted in FIG. 1, the support ticket 106*a* is associated with computing device 108*a*, and the support ticket 106*b* is associated with computing device 108*b*. The server 101 can create a service board 111 with a list 112 of support tickets 114*a*, 114*b*, and so on. Each support ticket 114*a-b* can have an identifier 113*a* and a priority 113*b*. The identifier 113*a* can be used to associate the support tickets 114*a-b* on the service board 111 with the support tickets 106*a-b* in memory 103. For example, in the embodiment depicted in FIG. 1, the support ticket 114*a* is associated with the support ticket 106*a*, and the support ticket 114*b* is associated with the support ticket 106*b*.

Computing devices 108*a-b* may be used by customers 110*a-b*, and computing device 108*c* can be used by a support agent 110*c*. Computing device 108*a* can generate a status 109*a*, and computing device 108*b* can generate a status 109*b*. The server 101 can use status 109*a* to determine or compute the priority 113*b* of support ticket 114*a*, which is associated with computing device 108*a*. Similarly, the server 101 can use status 109*b* to determine or compute the priority 113*b* of support ticket 114*b*, which is associated with computing device 108*b*. The server 101 may determine that the priority 113*b* of support ticket 114*a* is greater than the priority 113*b* of support ticket 114*b*, and may start a chat session 107 that is associated with the support ticket 106*a*. The chat session may be associated with the support agent 110*c* with computing device 108*c* and the customer 110*a* with computing device 108*a*.

The one or more servers 101 associated with the system do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The server 101, database 102, memory 103, service board 111, and computing devices 108*a-c* may be connected to a network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The system and its components, such as a server 101, database 102, memory 103, service board 111, computing devices 108a-c, and chat session 107 may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a server 101, database 102, memory 103, service board 111, computing devices 108a-c, and chat session 107 may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
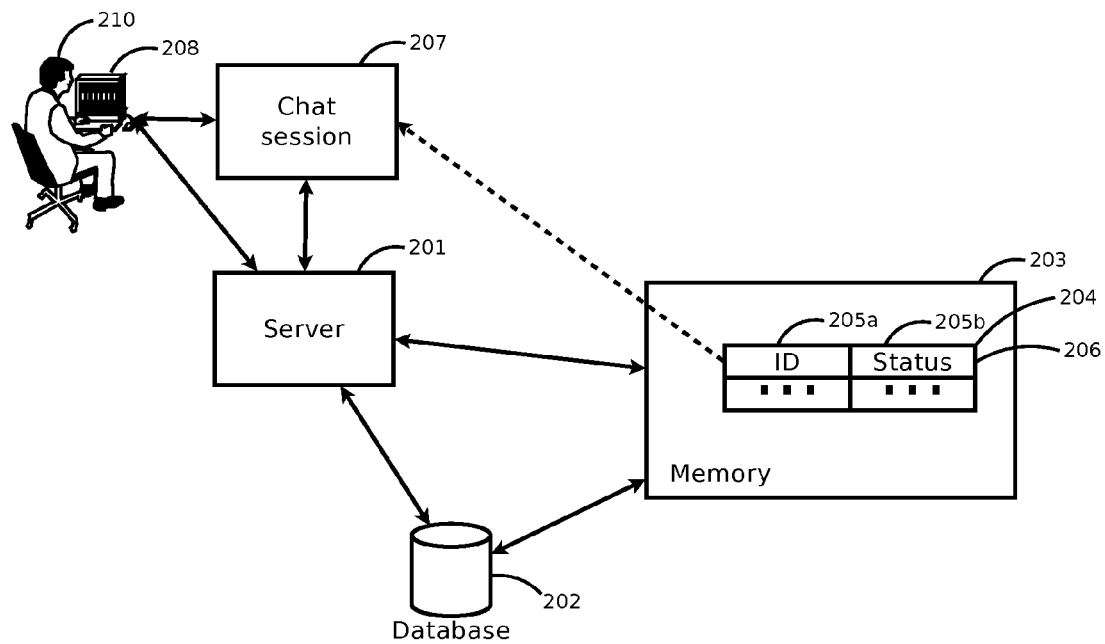
FIG. 2 is an illustrative block diagram of an embodiment of closing a support ticket and terminating a chat session.

FIG. 2 is an illustrative block diagram of an embodiment of closing a support ticket and terminating a chat session. The server 201 can access the database 202 to retrieve, into memory 203, a list 204 of support tickets 206. Each support ticket can have an identifier 205a and a ticket status 205b. The server 201 can start a chat session 207 that may be associated with a support ticket 206, and the chat session can be associated with a support agent 210 using a computing device 208. The support agent 210 may use the server 201 to close the ticket 206. As a result, the server 201 may update the status 205b of the ticket 206 to indicate a closed status, and may also terminate the chat session 207.

In some embodiments, the server 201 in FIG. 2 can include components or functionality of the server 101 as described with respect to FIG. 1. In some embodiments, the database 202 in FIG. 2 can include components or functionality of the database 102 as described with respect to FIG. 1. In some embodiments, the memory 203 in FIG. 2 can include components or functionality of the memory 103 as described with respect to FIG. 1. In some embodiments, the list 204 of support tickets in FIG. 2 can include components or functionality of the list 104 of support tickets as described with respect to FIG. 1. In some embodiments, the chat session 207 in FIG. 2 can include components or functionality of the chat session 107 as described with respect to FIG. 1. In some embodiments, the support agent 210 in FIG. 2 can include components or functionality of the support agent 110c as described with respect to FIG. 1. In some embodiments, the computing device 208 in FIG. 2 can include components or functionality of the computing device 108c as described with respect to FIG. 1.

Figure 3:
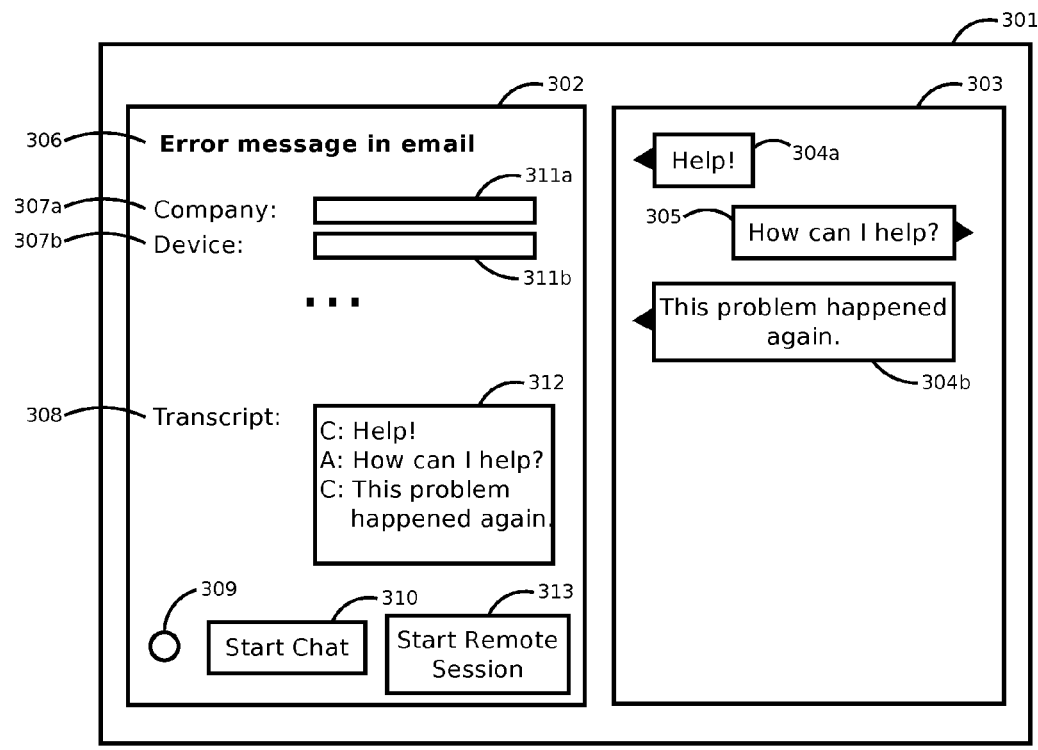
FIG. 3 is an illustrative example of an embodiment of a user interface for displaying a chat session that is associated with a ticket.

FIG. 3 is an illustrative example of an embodiment of a user interface for displaying a chat session that is associated with a ticket. The user interface 301 may contain a ticket display area 302 and a chat display area 303. The ticket display area 302 may contain a ticket summary 306. The ticket display area 302 may also contain field displays 311a, 311b, and so on. The field displays 311a-b may allow displaying and modifying the data associated with the fields, and the field displays 311a-b may have labels 307a-b to facilitate a user in finding and understanding the information associated with the fields 311a-b. The ticket display area 302 may also contain a transcript field display 312 that can display the contents of a transcript field associated with the ticket that is updated to contain transcripts of the chat sessions that have been associated with the ticket. The transcript field display 312 can also have a label 308 to facilitate a user in finding and understanding the information associated with the transcript field. The ticket display area 302 may also contain a status display 309 that can display the status of the computing device that is associated with the ticket, and may contain a button 310 to start a chat with the computing device that is associated with the ticket. The chat display area 303 can show the activity associated with a previous or current chat associated with the ticket, and may contain comments 304a-b by a customer and comments 305 by a support agent. The ticket display area 302 may contain a button 313 to start a remote control session of the computing device that is associated with the ticket, as will be shown with respect to FIG. 7.

Figure 4:
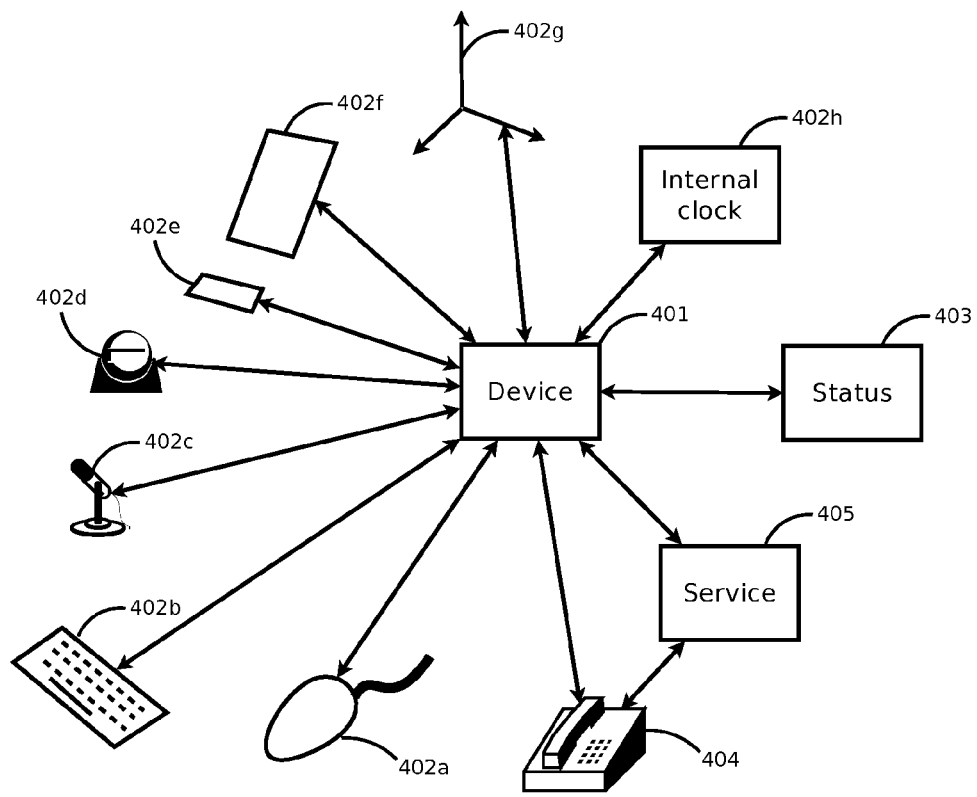
FIG. 4 is an illustrative block diagram of an embodiment of automatically determining the status of a computing device based on activity.

FIG. 4 is an illustrative block diagram of an embodiment of automatically determining the status of a computing device based on activity. The computing device 401 may be connected to a mouse 402*a*, a keyboard 402*b*, a microphone 402*c*, a camera 402*d*, a proximity sensor 402*e*, a touch screen 402*f*, a position/orientation sensing system 402*g*, or an internal clock 402*h*. The computing device 401 may also be connected to an external computing device 404, such as a phone, and may also have access to a service 405 that is used in conjunction with the device 404. The computing device 401 may be able to automatically update a status 403 to indicate whether the user of the computing device 401 is present. The computing device 401 may be able to do this by checking whether or not the mouse 402*a* has been used. If the mouse 402*a* has been used within the last few minutes, it is likely that the user of the computing device 401 is present. Conversely, if the mouse 402*a* has not been used for more than a few minutes, it is likely that the user of the computing device 401 is not present. A time interval such as five minutes can be used for this check and this can serve as a threshold time.

Similarly, activity on the keyboard 402*b* can be used in the same way with a threshold time to suggest the presence of the user of the computing device. The microphone 402*c* can be used in a similar way, but instead of detecting activity, the microphone 402*c* can be monitored for sounds above a threshold volume to detect the presence of the user. The camera 402*d* can be used in a similar way, but instead of detecting activity, the camera 402*d* can be monitored for changes in the visual field larger than a threshold amount to detect the presence of the user. The proximity detector 402*e* can be used directly to detect the presence of the user. Activity on the touch screen 402*f* can be used in the same way as the mouse 402*a* and keyboard 402*b*, with a threshold time to suggest the presence of the user. The position/orientation sensing system 402*g* can detect whether the device 401 is being moved, which can be used with a threshold time to suggest the presence of the user.

The internal clock 402*h* can be used to determine the current time, which can be compared to a schedule for the user. During times at which the user is known to be away, or when the user does not wish to communicate, the status 403 can be updated to indicate that the user is not present.

If the external device 404 indicates that it is in use, the status may be updated to indicate that the user is not present. For example, if the user is using the telephone, this may preclude the user from being available for other forms of communication. The device 401 may be able to determine the status of the external device 404 directly, or by using a service 405 that is used by the external device 404, or using a combination of the two.

In some embodiments, the computing device 401 in FIG. 4 can include components or functionality of the computing devices 108*a-b* as described with respect to FIG. 1.

Figure 5:
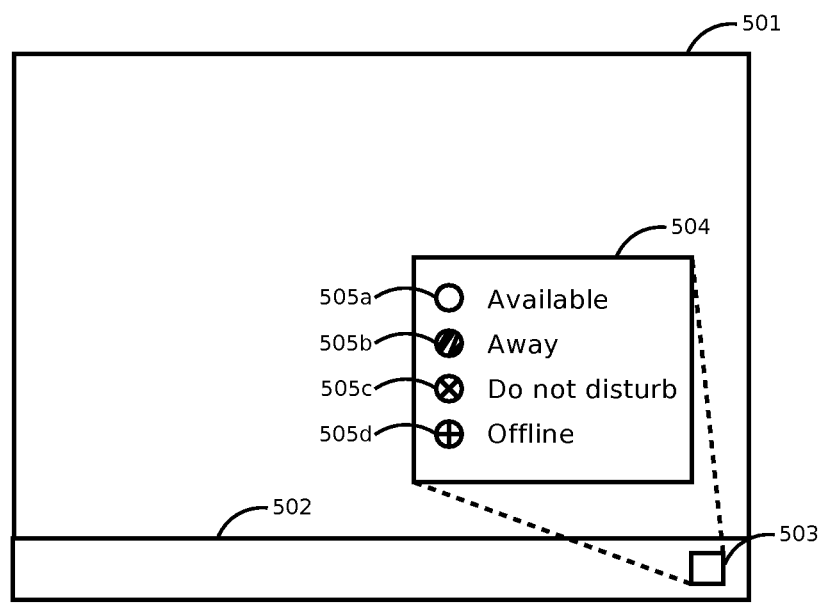
FIG. 5 is an illustrative example of an embodiment of a user interface for setting the status of a computing device.

FIG. 5 is an illustrative example of an embodiment of a user interface for setting the status of a computing device. The user's display area 501 may have a task management area 502 sometimes known as a taskbar. The task management area 502 may have a small active area 503 that may be an icon. Selecting the active area 503 can make a user interface 504 visible. The user interface 504 may provide options 505*a-d* for setting the status of the device by the user. For example, the user may want to indicate that he or she is available for communication 505*a*, is away from the device 505*b*, does not want to be disturbed 505*c*, or is offline 505*d*. The setting selected by the user may override any setting that is automatically determined as described with respect to FIG. 4.

Figure 6:
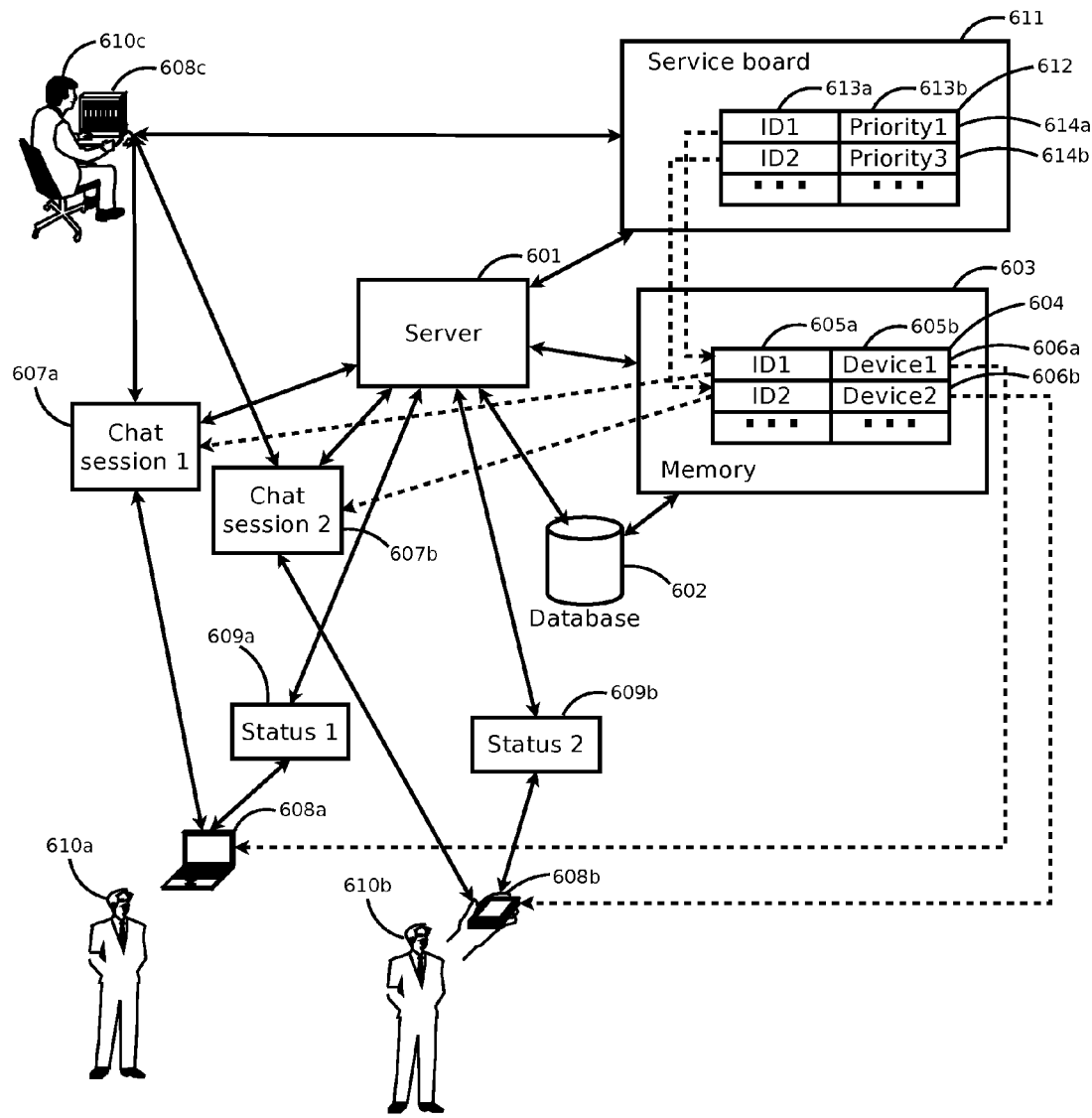
FIG. 6 is an illustrative block diagram of an embodiment of updating the priority of a ticket based on a change in the status of a computing device.

FIG. 6 is an illustrative block diagram of an embodiment of updating the priority of a ticket based on a change in the status of a computing device. The server 601 can access the database 602 and retrieve, into memory 603, a list 604 of support tickets 606*a*, 606*b*, and so on. Each support ticket 606*a-b* can have an identifier 605*a* and an association 605*b* to a computing device. For example, in the embodiment depicted in FIG. 6, the support ticket 606*a* is associated with computing device 608*a*, and the support ticket 606*b* is associated with computing device 608*b*. The server 601 can create a service board 611 with a list of support tickets 614*a*, 614*b*, and so on. Each support ticket 614*a-b* can have an identifier 613*a* and a priority 613*b*. The identifier 613*a* can be used to associate the support tickets 614*a-b* on the service board 611 with the support tickets 606*a-b* in memory 603. For example, in the embodiment depicted in FIG. 6, the support ticket 614*a* is associated with the support ticket 606*a*, and the support ticket 614*b* is associated with the support ticket 606*b*.

Computing devices 608*a-b* may be used by customers 610*a-b*, and computing device 608*c* can be used by a support agent 610*c*. Computing device 608*a* can generate a status 609*a*, and computing device 608*b* can generate a status 609*b*. The server 601 can use status 609*a* to compute the priority 613*b* of support ticket 614*a*, which is associated with computing device 608*a*. Similarly, the server 601 can use status 609*b* to compute the priority 613*b* of support ticket 614*b*, which is associated with computing device 608*b*. The server 601 may determine that the priority 613*b* of support ticket 614*a* is greater than the priority 613*b* of support ticket 614*b*, and may start a chat session 607*a* that is associated with the support ticket 606*a*. The chat session may be associated with the support agent 610*c* with computing device 608*c* and the customer 610*a* with computing device 608*a*.

The status 609*b* of computing device 608*b* may change to a new value. The server 601 may use this new status 609*b* to compute a new value for the priority 613*b* of support ticket 614*b*. The server 601 may determine that the priority 613*b* of support ticket 614*b* is now greater than the priority 613*b* of support ticket 614*a*, and may start a second chat session 607*b* that is associated with the support ticket 606*b*. The chat session 607*b* may be associated with the support agent 610*c* with computing device 608*c* and the customer 610*b* with computing device 608*b*.

In some embodiments, the server 601 in FIG. 6 can include components or functionality of the server 101 as described with respect to FIG. 1. In some embodiments, the database 602 in FIG. 6 can include components or functionality of the database 102 as described with respect to FIG. 1. In some embodiments, the memory 603 in FIG. 6 can include components or functionality of the memory 103 as described with respect to FIG. 1. In some embodiments, the list 604 of support tickets in FIG. 6 can include components or functionality of the list 104 of support tickets as described with respect to FIG. 1. In some embodiments, the service board 611 in FIG. 6 can include components or functionality of the service board 111 as described with respect to FIG. 1. In some embodiments, the list 612 of support tickets in FIG. 6 can include components or functionality of the list 112 of support tickets as described with respect to FIG. 1. In some embodiments, the chat sessions 607*a-b* in FIG. 6 can include components or functionality of the chat session 107 as described with respect to FIG. 1. In some embodiments, the statuses 609*a-b* in FIG. 6 can include components or functionality of the statuses 109*a-b* as described with respect to FIG. 1. In some embodiments, the computing devices 608*a-c* in FIG. 6 can include components or functionality of the computing devices 108a-c as described with respect to FIG. 1. In some embodiments, the customers 610a-b in FIG. 6 can include components or functionality of the customers 110a-b as described with respect to FIG. 1. In some embodiments, the support agent 610c in FIG. 6 can include components or functionality of the support agent 110c as described with respect to FIG. 1.

Figure 7:
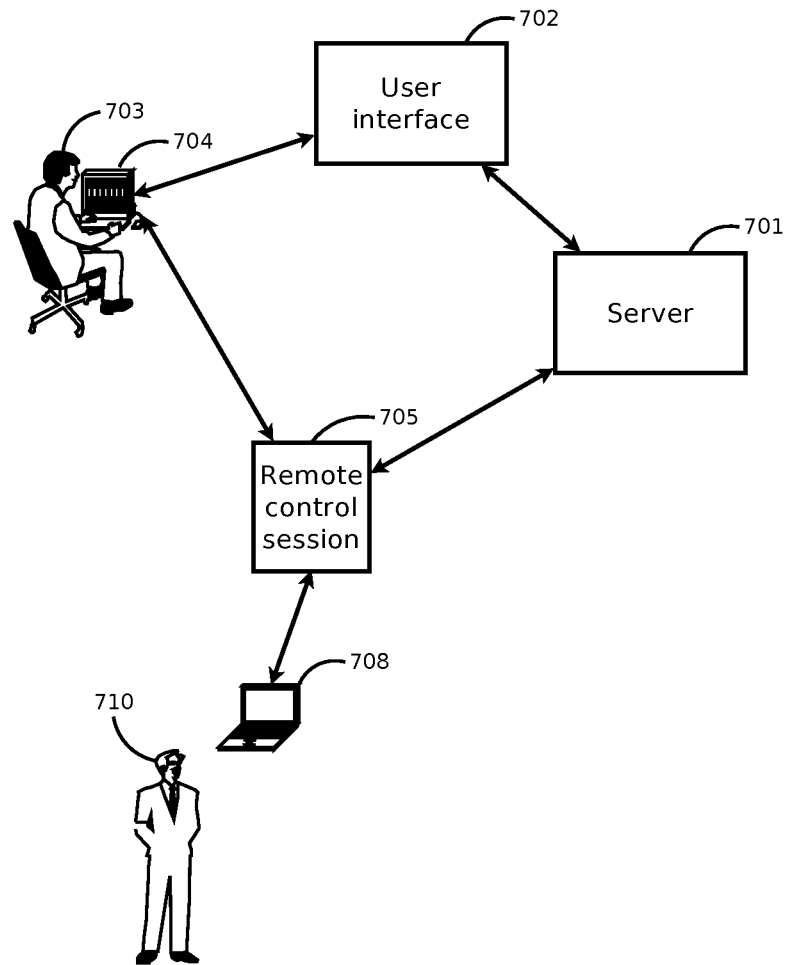
FIG. 7 is an illustrative block diagram of an embodiment of a support agent starting a remote control session.

FIG. 7 is an illustrative block diagram of an embodiment of a support agent starting a remote control session. The server 701 may present a user interface 702 to the support agent 703 through the computing device 704. The support agent 703 may use the user interface 702 to indicate the desire to start a remote control session 705 to support the computing device 708 of customer 710, and the server 701 can start the remote control session 705.

In some embodiments, the server 701 in FIG. 7 can include components or functionality of the server 101 as described with respect to FIG. 1. In some embodiments, the computing device 704 in FIG. 7 can include components or functionality of the computing device 108c as described with respect to FIG. 1. In some embodiments, the support agent 703 in FIG. 7 can include components or functionality of the support agent 110c as described with respect to FIG. 1. In some embodiments, the customer 710 in FIG. 7 can include components or functionality of the customers 110a-b as described with respect to FIG. 1. In some embodiments, the computing device 708 in FIG. 7 can include components or functionality of the computing devices 108a-b as described with respect to FIG. 1. In some embodiments, the user interface 702 in FIG. 7 can include components or functionality of the user interface 301 as described with respect to FIG. 3.

Figure 8:
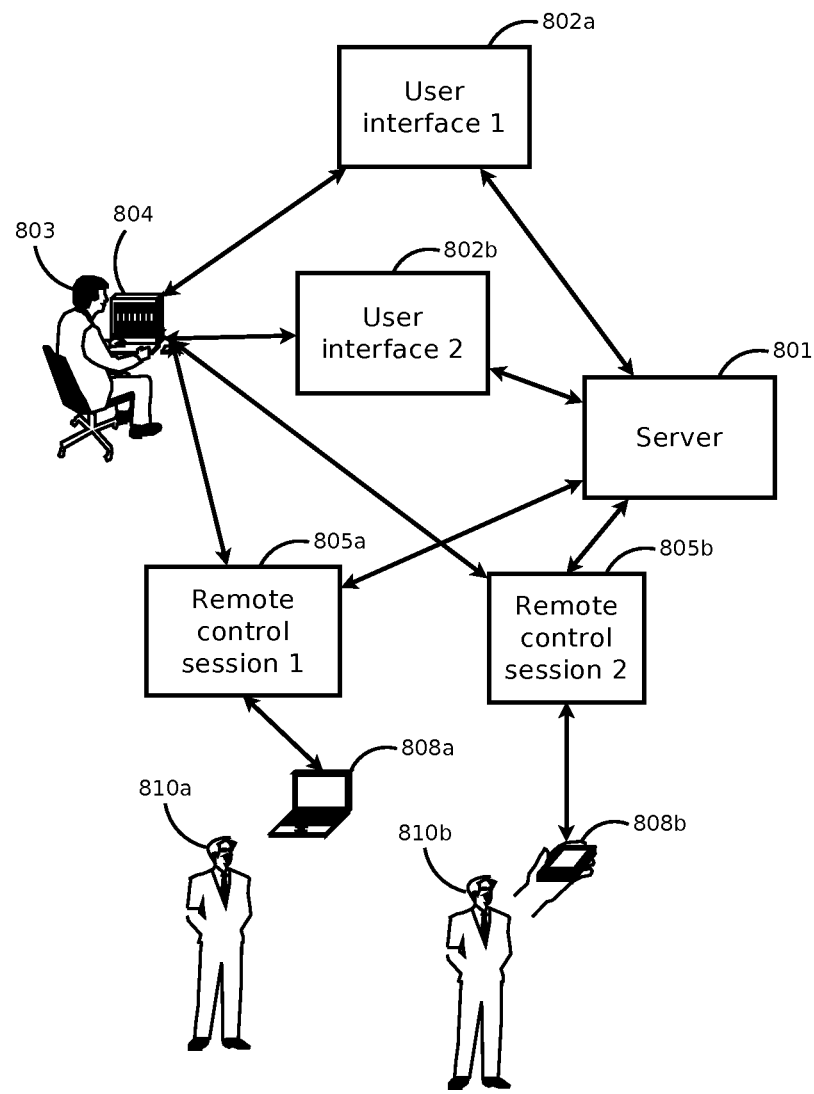
FIG. 8 is an illustrative block diagram of an embodiment of a support agent starting a second remote control session.

FIG. 8 is an illustrative block diagram of an embodiment of a support agent starting a second remote control session. The server 801 may present a user interface 802a to the support agent 803 through the computing device 804. The support agent 803 may use the user interface 802a to indicate the desire to start a remote control session 805a to support the computing device 808a of customer 810a, and the server 801 can start the remote control session 805a. The server 801 may present a second user interface 802b to the support agent 803 through the computing device 804. The support agent 803 may use the second user interface 802b to indicate the desire to start a second remote control session 805b to support the computing device 808b of customer 810b, and the server 801 can start the second remote control session 805b.

In some embodiments, the server 801 in FIG. 8 can include components or functionality of the server 101 as described with respect to FIG. 1. In some embodiments, the computing device 804 in FIG. 8 can include components or functionality of the computing device 108c as described with respect to FIG. 1. In some embodiments, the support agent 803 in FIG. 8 can include components or functionality of the support agent 110c as described with respect to FIG. 1. In some embodiments, the customers 810a-b in FIG. 8 can include components or functionality of the customers 110a-b as described with respect to FIG. 1. In some embodiments, the computing devices 808a-b in FIG. 8 can include components or functionality of the computing devices 108a-b as described with respect to FIG. 1. In some embodiments, the user interfaces 802a-b in FIG. 7 can include components or functionality of the user interface 301 as described with respect to FIG. 3. In some embodiments, the remote control sessions 805a-b in FIG. 8 can include components or functionality of the remote control session 705 as described with respect to FIG. 7.

Figure 9:
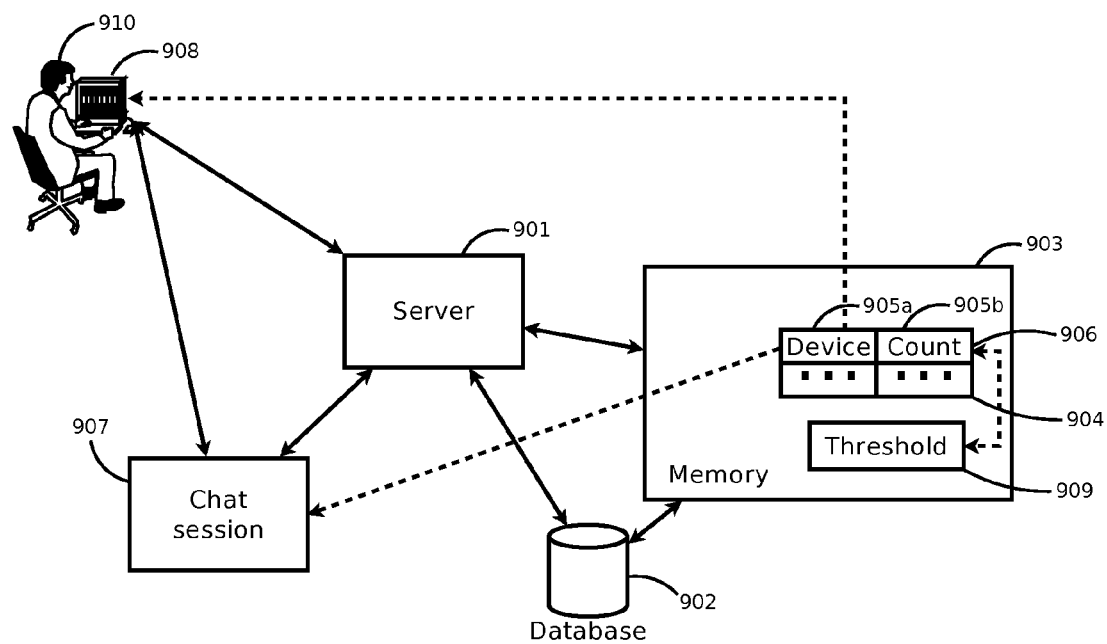
FIG. 9 is an illustrative block diagram of an embodiment of limiting the number of chat sessions for a single support agent, based on a count.

FIG. 9 is an illustrative block diagram of an embodiment of limiting the number of chat sessions for a single support agent, based on a count. The server 901 can prepare to initiate an additional chat session 907 associated with a computing device 908 used by a support agent 910. The server 901 can access the database 902 to retrieve, in memory 903, a table 904 associating each computing device 905a with a count 905b of current chat sessions. The server can also retrieve, in memory 903, a threshold 909 for limiting the number of chat sessions per device. The server can find the count 905b that is associated with the chat session 907 through the device 905a, increment the count 905b, and compare it to the threshold 909. If the incremented count 905b is greater than the threshold 909, the server can prevent the additional chat session 907 from starting. Conversely, if the incremented count 905b is less than or equal to the threshold 909, the server 901 can continue with the additional chat session 907, and update the count 905b in memory 903 and in the database 902.

In some embodiments, the server 901 in FIG. 9 can include components or functionality of the server 101 as described with respect to FIG. 1. In some embodiments, the database 902 in FIG. 9 can include components or functionality of the database 102 as described with respect to FIG. 1. In some embodiments, the memory 903 in FIG. 9 can include components or functionality of the memory 103 as described with respect to FIG. 1. In some embodiments, the chat session 907 in FIG. 9 can include components or functionality of the chat session 107 as described with respect to FIG. 1. In some embodiments, the computing device 908 in FIG. 9 can include components or functionality of the computing device 108c as described with respect to FIG. 1. In some embodiments, the support agent 910 in FIG. 9 can include components or functionality of the support agent 110c as described with respect to FIG. 1.

Figure 10:
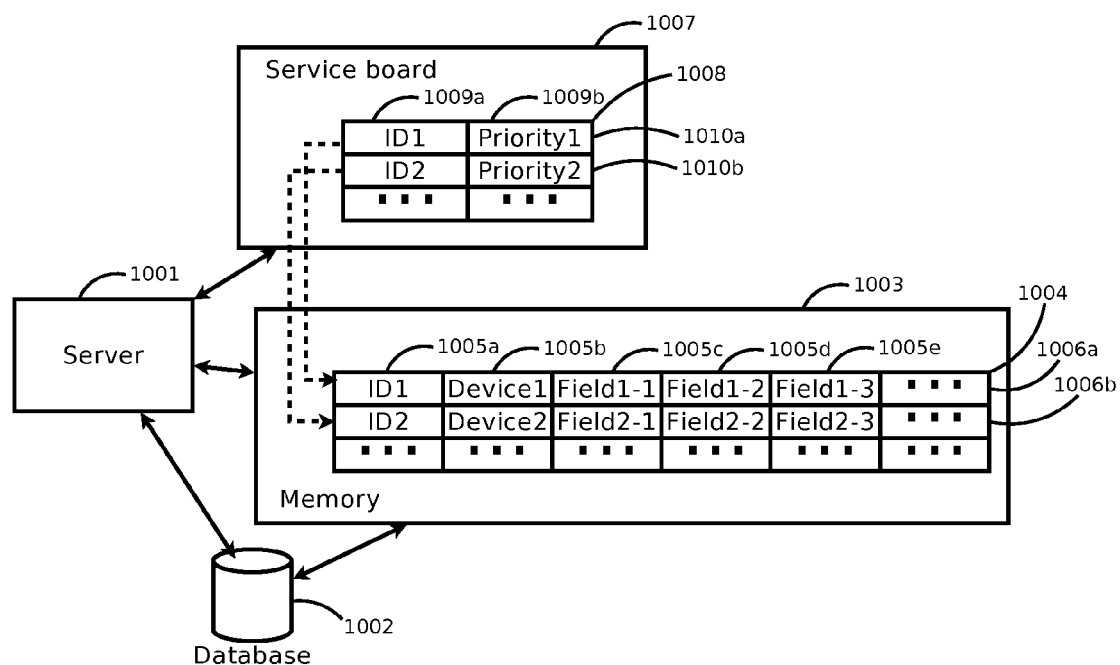
FIG. 10 is an illustrative block diagram of an embodiment of using additional descriptive fields associated with a support ticket to prioritize the support ticket.

FIG. 10 is an illustrative block diagram of an embodiment of using additional descriptive fields associated with a support ticket to prioritize the support ticket. The server 1001 can access the database 1002 and retrieve, in memory 1003, a list 1004 of support tickets 1006a, 1006b, and so on. Each support ticket 1006a-b can have an identifier 1005a, an indicator 1005b of an associated computing device, and a series of descriptive fields 1005c, 1005d, 1005e, and so on. The server 1001 can create a service board 1007 with a list 1008 of support tickets 1010a, 1010b, and so on. Each support ticket 1010a-b can have an identifier 1009a and a priority 1009b. The identifier 1009a can be used to associate the support tickets 1010a-b on the service board 1007 with the support tickets 1006a-b in memory 1003. For example, in the embodiment depicted in FIG. 10, the support ticket 1010a is associated with the support ticket 1006a, and the support ticket 1010b is associated with the support ticket 1006b.

The server 1001 can use the descriptive fields 1005c-e, and so on, associated with support ticket 1006a to compute the priority 1009b of support ticket 1010a. Similarly, the server 1001 can use the descriptive fields 1005c-e, and so on, associated with support ticket 1006b to compute the priority 1009b of support ticket 1010b.

The descriptive fields 1005c-e, and so on, for a support ticket may include, for example, the company name for the customer, the contact name for the customer, the phone number for the customer, the email address for the customer, a site name for the customer, the address for the customer, the service agreement for the customer, a sales opportunity being pursued, the deadline for the ticket, the service level agreement (SLA) for the ticket, the ticket status, the class of service applied to the ticket, the way the ticket was originally entered, the person who originally entered the ticket, the severity of the ticket, the impact of the ticket, the time budgeted for the ticket, a summary of the issue, a detailed description of the issue, the history of the ticket so far, internal notes about the ticket, the account manager for the customer, or any other information related to the support ticket.

In some embodiments, the server 1001 in FIG. 10 can include components or functionality of the server 101 as described with respect to FIG. 1. In some embodiments, the database 1002 in FIG. 10 can include components or functionality of the database 102 as described with respect to FIG. 1. In some embodiments, the memory 1003 in FIG. 10 can include components or functionality of the memory 103 as described with respect to FIG. 1. In some embodiments, the list 1004 of support tickets in FIG. 10 can include components or functionality of the list 104 of support tickets as described with respect to FIG. 1. In some embodiments, the service board 1007 in FIG. 10 can include components or functionality of the service board 111 as described with respect to FIG. 1. In some embodiments, the list 1008 of support tickets in FIG. 10 can include components or functionality of the list 112 of support tickets as described with respect to FIG. 1.

Figure 11A:
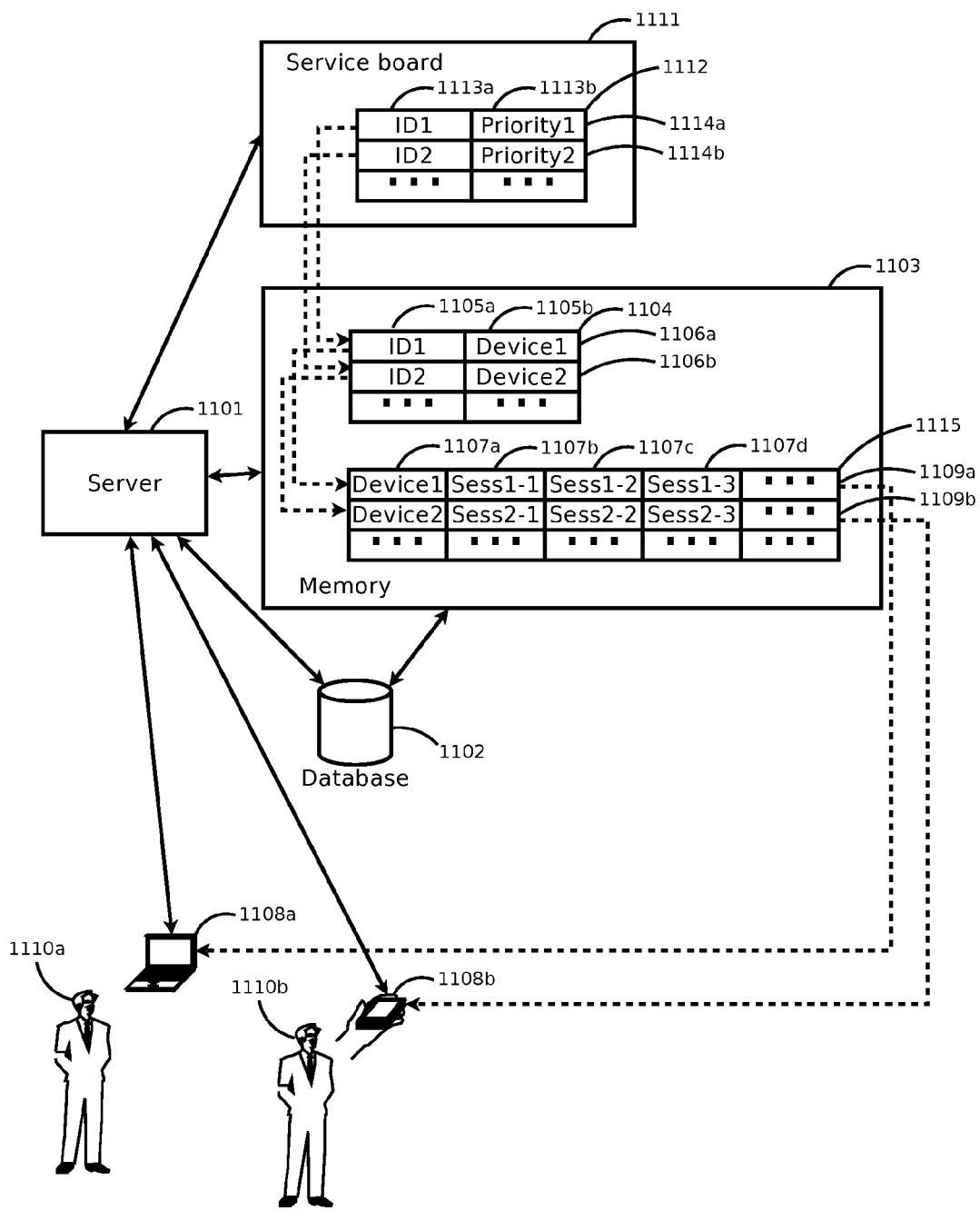
FIG. 11A is an illustrative block diagram of an embodiment of using session information associated with computing devices to prioritize support tickets associated with the computing devices.

FIG. 11A is an illustrative block diagram of an embodiment of using session information associated with computing devices to prioritize support tickets associated with the computing devices. The server 1101 can access the database 1102 to store, in memory 1103, a list 1104 of support tickets 1106a, 1106b, and so on, and a list 1115 of devices 1109a, 1109b, and so on. The support tickets 1106a-b can contain an identifier 1105a and a reference to a computing device 1105b. The devices 1109a-b can contain a device identifier 1107a and a set of session variables 1107b-d and so on. The device identifier 1105b associated with a support ticket 1106a-b can be used to associate the support ticket 1106a-b with a device 1109a-b in the list 1115. For example, in the embodiment depicted in FIG. 11A, the support ticket 1106a is associated with the device 1109a, and the support ticket 1106b is associated with the device 1109b.

Customers 1110a-b can use computing devices 1108a-b. The devices 1109a-b in the list 1115 can be associated with the computing devices 1108a-b. For example, in the embodiment depicted in FIG. 11A, the device 1109a is associated with the computing device 1108a, and the device 1109b is associated with the computing device 1108b.

The server 1101 can create a service board 1111 with a list 1112 of support tickets 1114a, 1114b, and so on. Each support ticket 1114a-b can have an identifier 1113a and a priority 1113b. The identifier 1113a can be used to associate the support tickets 1114a-b on the service board 1111 with the support tickets 1106a-b in memory 1103. For example, in the embodiment depicted in FIG. 11A, the support ticket 1114a is associated with the support ticket 1106a, and the support ticket 1114b is associated with the support ticket 1106b.

The server 1101 can use the session fields 1107b-d, and so on, associated with support ticket 1106a through device 1109a to compute the priority 1113b of support ticket 1114a. Similarly, the server 1101 can use the descriptive fields 1107b-d, and so on, associated with support ticket 1006b through device 1109b to compute the priority 1113b of support ticket 1114b.

In some embodiments, the server 1101 in FIG. 11A can include components or functionality of the server 101 as described with respect to FIG. 1. In some embodiments, the database 1102 in FIG. 11A can include components or functionality of the database 102 as described with respect to FIG. 1. In some embodiments, the memory 1103 in FIG. 11A can include components or functionality of the memory 103 as described with respect to FIG. 1. In some embodiments, the list 1104 of support tickets in FIG. 11A can include components or functionality of the server 104 as described with respect to FIG. 1. In some embodiments, the service board 1111 in FIG. 11A can include components or functionality of the service board 111 as described with respect to FIG. 1. In some embodiments, the list 1112 of support tickets in FIG. 11A can include components or functionality of the list 112 of support tickets as described with respect to FIG. 1. In some embodiments, the computing devices 1108a-b in FIG. 11A can include components or functionality of the computing devices 108a-b as described with respect to FIG. 1. In some embodiments, the customers 1110a-b in FIG. 11A can include components or functionality of the customers 110a-b as described with respect to FIG. 1.

Figure 11B:
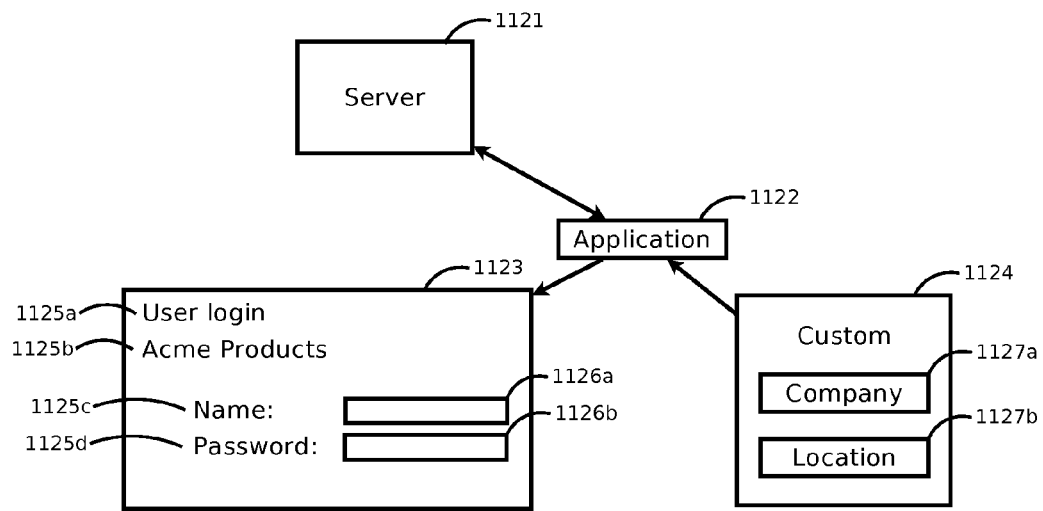
FIG. 11B is an illustrative block diagram of an embodiment of generating a user interface to collect session information associated with a computing device, including an illustrative example of an embodiment of a user interface for collecting session fields.

FIG. 11B is an illustrative block diagram of an embodiment of generating a user interface to collect session information associated with a computing device, including an illustrative example of an embodiment of a user interface for collecting session fields. The server 1121 can provide an application 1122. The application 1122 can incorporate some custom information 1124 for each customer that can contain session fields 1127a-b that are specific to the customer. For example, in the embodiment depicted in FIG. 11B, session field 1127a is the company name of the customer, and session field 1127b is the location of the customer. The application 1122 can present a user interface 1123 that can display and allow updates to session fields 1126a-b that can be specific to the computing device that is running the application. For example, in the embodiment depicted in FIG. 11B, session field 1126a is the username of the person using the computing device that is running the application, and session field 1127b is the password associated with the username 1126a. In this way, the application 1122 and the server 1121 can authenticate the user and provide specific functionality on a per-user basis. The user interface 1123 can include other text such as general identifying text 1125a, text based on other session fields 1125b, and session field labels 1125c-d. In the embodiment depicted in FIG. 11B, the text 1125b is derived from the value of the session field 1127a.

In some embodiments, the server 1121 in FIG. 11B can include components or functionality of the server 101 as described with respect to FIG. 1.

Figure 12:
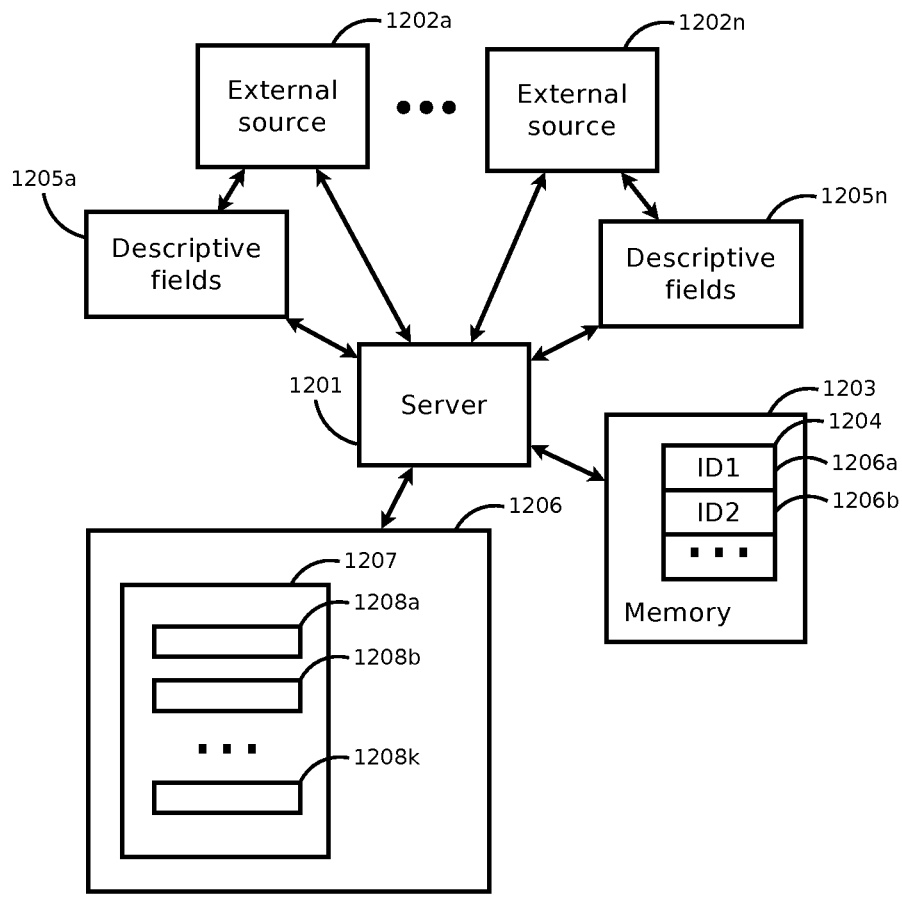
FIG. 12 is an illustrative block diagram of an embodiment of using additional descriptive information associated with a support ticket from other sources, including an illustrative example of an embodiment of a user interface for displaying the additional descriptive information along with the support ticket.

FIG. 12 is an illustrative block diagram of an embodiment of using additional descriptive information associated with a support ticket from other sources, including an illustrative example of an embodiment of a user interface for displaying the additional descriptive information along with the support ticket. The server 1201 can reference a list 1204 of support tickets in memory 1203. The server 1201 can use a support ticket identifier 1206a-b, and so on, to access descriptive fields 1205a-n about a support ticket from external sources 1202a-n. The server can generate a user interface 1206 with a ticket area 1207 that can contain elements 1208a-k that can allow the display and update of the descriptive fields 1205a-n associated with the ticket identifier 1206a-b.

In some embodiments, the server 1201 in FIG. 12 can include components or functionality of the server 101 as described with respect to FIG. 1. In some embodiments, the memory 1203 in FIG. 12 can include components or functionality of the memory 103 as described with respect to FIG. 1. In some embodiments, the list 1204 of support tickets in FIG. 12 can include components or functionality of the list 104 of support tickets as described with respect to FIG. 1. In some embodiments, the user interface 1206 in FIG. 12 can include components or functionality of the user interface 301 as described with respect to FIG. 3. In some embodiments, the ticket display area 1207 in FIG. 12 can include components or functionality of the ticket display area 302 as described with respect to FIG. 3. In some embodiments, the field displays 1208a-k in FIG. 12 can include components or functionality of the field displays 311a-b as described with respect to FIG. 3.

Figure 13:
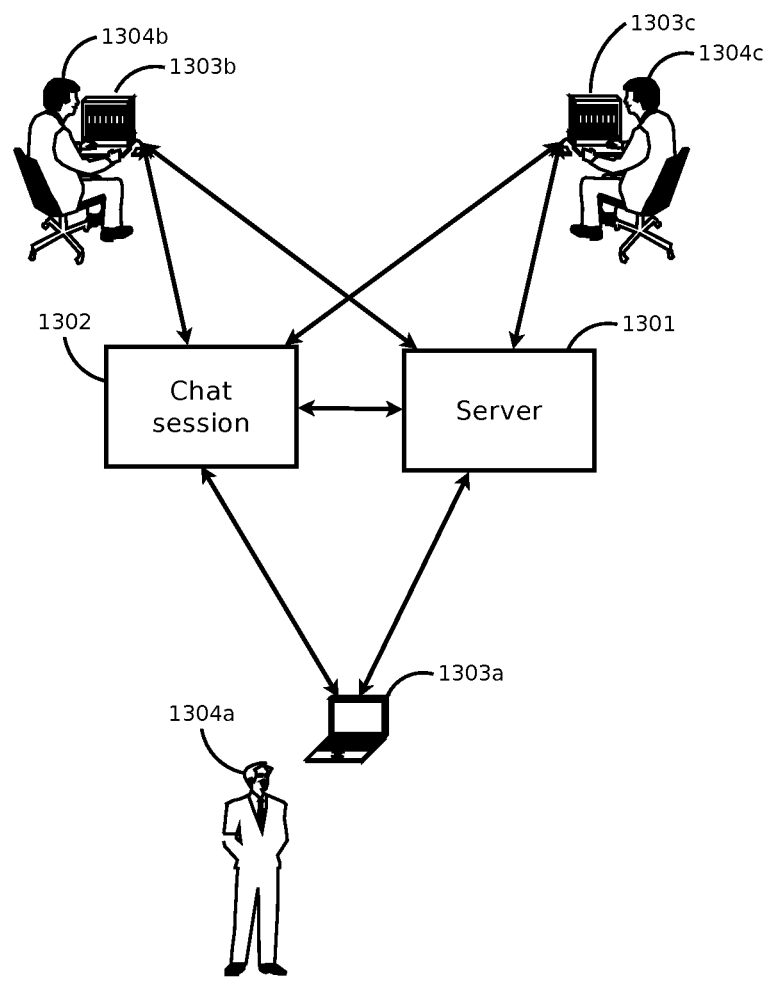
FIG. 13 is an illustrative block diagram of an embodiment of adding a second support agent to a chat session with a customer.

FIG. 13 is an illustrative block diagram of an embodiment of adding a second support agent to a chat session with a customer. The server 1301 can start a chat session 1302 that can be associated with a support agent 1304b using computing device 1303b, and a customer 1304a using computing device 1303a. The server can add a new support agent 1304c using computing device 1303c to the chat session 1302, so that all three participants 1304a-c can see the chat messages from each other.

The server 1301 can remove support agent 1304b and computing device 1303b from the chat session 1302. By doing this, the support agent 1304b has passed the support session to support agent 1304c, who can continue to support the customer 1304a.

In some embodiments, the server 1301 in FIG. 13 can include components or functionality of the server 101 as described with respect to FIG. 1. In some embodiments, the customer 1304a in FIG. 13 can include components or functionality of the customers 110a-b as described with respect to FIG. 1. In some embodiments, the support agents 1304b-c in FIG. 13 can include components or functionality of the support agent 110c as described with respect to FIG. 1. In some embodiments, the computing devices 1303a-c in FIG. 13 can include components or functionality of the computing devices 108a-c as described with respect to FIG. 1. In some embodiments, the chat session 1302 in FIG. 13 can include components or functionality of the chat session 107 as described with respect to FIG. 1.

Figure 14A:
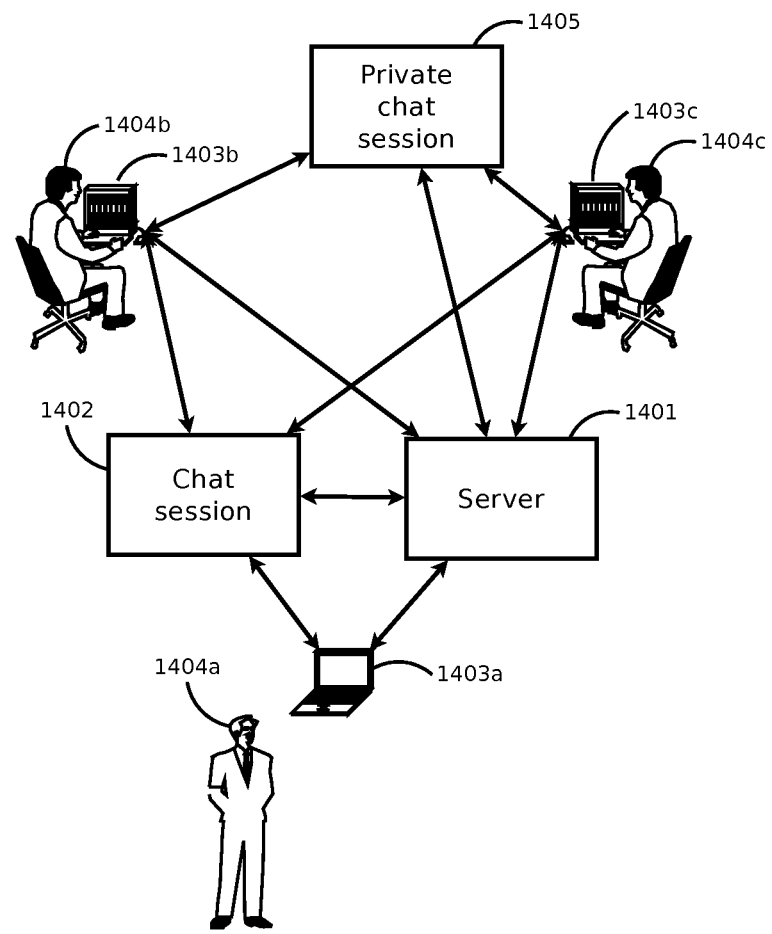
FIG. 14A is an illustrative block diagram of an embodiment of starting a private chat session between two support agents working with a customer.

FIG. 14A is an illustrative block diagram of an embodiment of starting a private chat session between two support agents working with a customer. The server 1401 can start a chat session 1402 that can be associated with a support agent 1404b using computing device 1403b, a support agent 1404c using computing device 1403c, and a customer 1404a using computing device 1403a, so that all three participants 1404a-c can see the chat messages from each other. The server 1401 can start a private chat session 1405 that is associated with support agent 1404b using computing device 1403b and support agent 1404c using computing device 1403c. Messages between the support agents 1404b-c in this private chat session 1405 may not be displayed on the computing device 1403a, and may therefore not be visible to the customer 1404a.

In some embodiments, the server 1401 in FIG. 14A can include components or functionality of the server 101 as described with respect to FIG. 1. In some embodiments, the customer 1404a in FIG. 14A can include components or functionality of the customers 110a-b as described with respect to FIG. 1. In some embodiments, the support agents 1404b-c in FIG. 14A can include components or functionality of the support agent 110c as described with respect to FIG. 1. In some embodiments, the computing devices 1403a-c in FIG. 14A can include components or functionality of the computing devices 108a-c as described with respect to FIG. 1. In some embodiments, the chat session 1402 in FIG. 14A can include components or functionality of the chat session 107 as described with respect to FIG. 1.

Figure 14B:
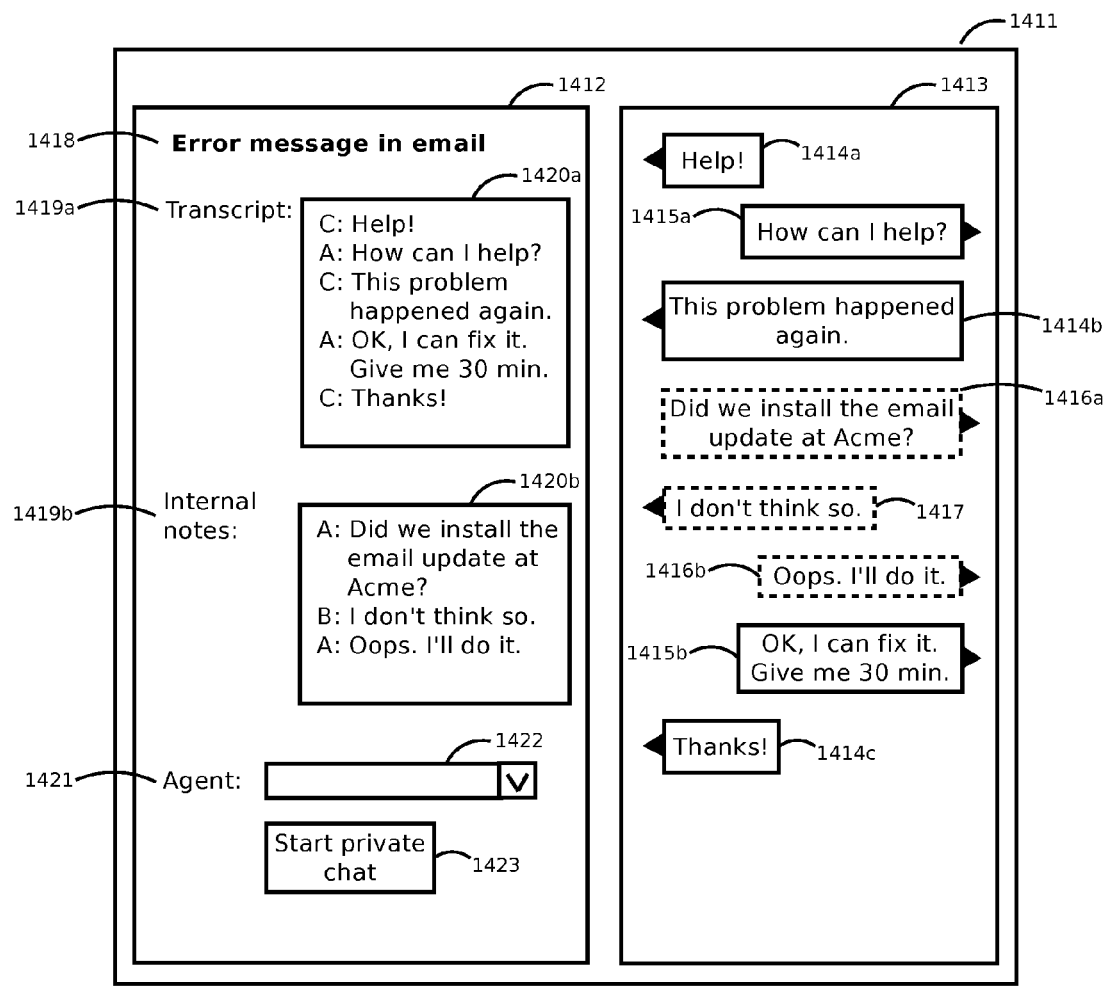
FIG. 14B is an illustrative example of an embodiment of a user interface for displaying a private chat session between two support agents working with a customer.

FIG. 14B is an illustrative example of an embodiment of a user interface for displaying a private chat session between two support agents working with a customer. The user interface 1411 can have a ticket display area 1412 and a chat display area 1413. The ticket display area 1412 can contain a button 1423 to start a private chat associated with the support ticket with another support agent, and a control 1422 to select the support agent for the private chat, along with a label 1421 to identify the control. The ticket display area 1412 can contain a ticket summary 1418, a transcript area 1420a and a label 1419a for the transcript area 1420a, and an area 1420b for internal notes along with a label 1419b for the internal notes area 1420b. The chat display area 1413 can show customer messages 1414a-c and support agent messages 1415a-b that all participants can see. The chat display area 1413 can show support agent messages 1416a-b and second support agent messages 1417 that only the support agents can see, and not the customer. The messages 1414a-c and 1415a-b can be copied into the transcript field that can be displayed by the transcript area 1420a of the support ticket, where both the customer and support agents can refer to them. The messages 1416a-b and 1417 can be copied into the internal notes field that can be displayed by the area 1420b for internal notes of the support ticket, where only the support agents can refer to them.

In some embodiments, the user interface 1411 in FIG. 14B can include components or functionality of the user interface 301 as described with respect to FIG. 3. In some embodiments, the ticket display 1412 in FIG. 14B can include components or functionality of the ticket display 302 as described with respect to FIG. 3. In some embodiments, the chat display 1413 in FIG. 14B can include components or functionality of the chat display 303 as described with respect to FIG. 3. In some embodiments, the ticket summary 1418 in FIG. 14B can include components or functionality of the ticket summary 306 as described with respect to FIG. 3. In some embodiments, the field displays 1420a-b in FIG. 14B can include components or functionality of the field displays 311a-b as described with respect to FIG. 3. In some embodiments, the customer entries 1414a-c in FIG. 14B can include components or functionality of the customer entries 304a-b as described with respect to FIG. 3. In some embodiments, the support agent entries 1415a-b in FIG. 14B can include components or functionality of the support agent entry 305 as described with respect to FIG. 3.

Figure 15:
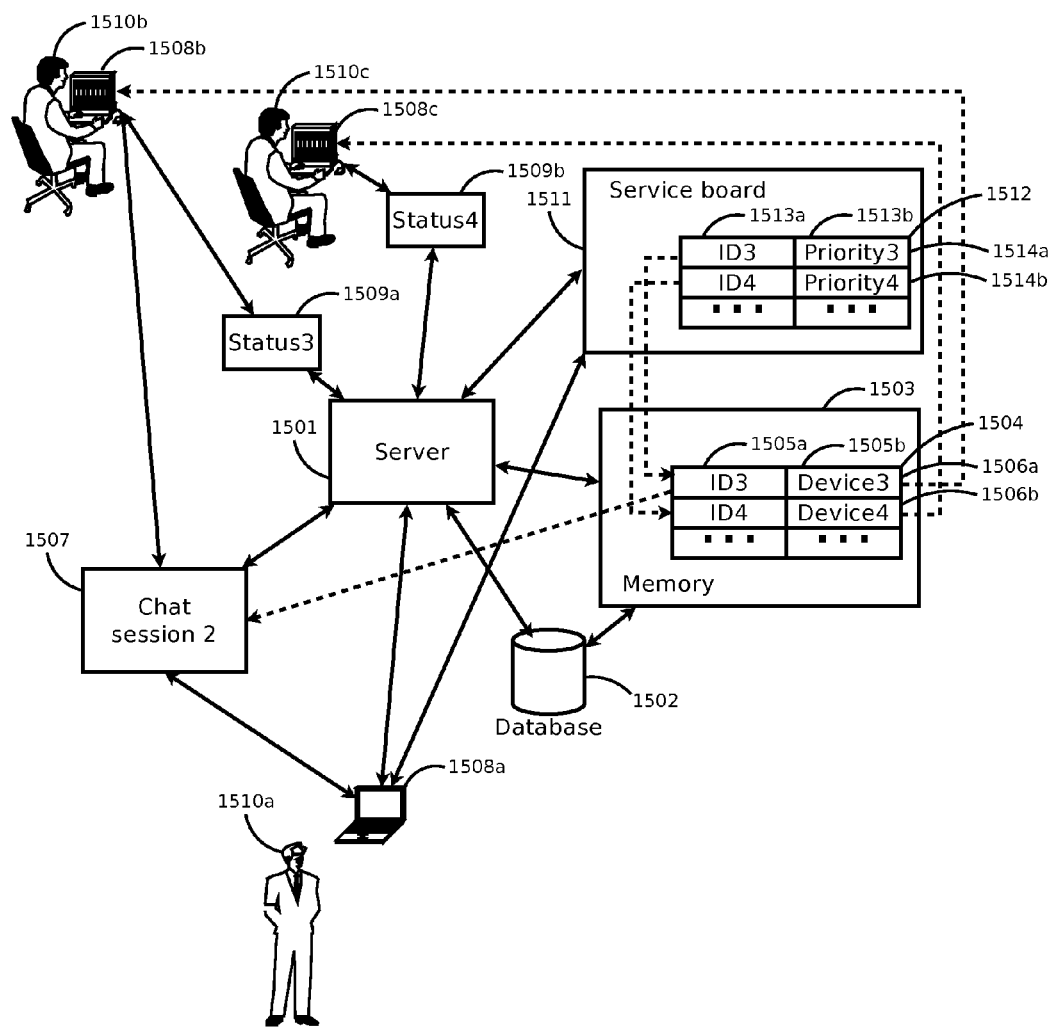
FIG. 15 is an illustrative block diagram of an embodiment of a customer prioritizing support tickets based on the status of computing devices associated with support agents, and starting a chat session, associated with a support ticket, with a support agent, based on the prioritization.

FIG. 15 is an illustrative block diagram of an embodiment of a customer prioritizing support tickets based on the status of computing devices associated with support agents, and starting a chat session, associated with a support ticket, with a support agent, based on the prioritization. The server 1501 can access the database 1502 and retrieve, into memory 1503, a list 1504 of support tickets 1506a, 1506b, and so on. Each support ticket 1506a-b can have an identifier 1505a and an association 1505b to a computing device. For example, in the embodiment depicted in FIG. 15, the support ticket 1506a is associated with computing device 1508b, and the support ticket 1506b is associated with computing device 1508c. The server 1501 can create a service board 1511 with a list 1512 of support tickets 1514a, 1514b, and so on. Each support ticket 1514a-b can have an identifier 1513a and a priority 1513b. The identifier 1513a can be used to associate the support tickets 1514a-b on the service board 1511 with the support tickets 1506a-b in memory 1503. For example, in the embodiment depicted in FIG. 15, the support ticket 1514a is associated with the support ticket 1506a, and the support ticket 1514b is associated with the support ticket 1506b.

Computing devices 1508b-c may be used by support agents 1510b-c, and computing device 1508a can be used by a customer 1510a. Computing device 1508b can generate a status 1509a, and computing device 1508c can generate a status 1509b. The server 1501 can use status 1509a to compute the priority 1513b of support ticket 1514a, which is associated with support ticket 1506a, which is in turn associated with computing device 1508b. Similarly, the server 1501 can use status 1509b to compute the priority 1513b of support ticket 1514b, which is associated with support ticket 1506b, which is in turn associated with computing device 1508c. The server 1501 may determine that the priority 1513b of support ticket 1514a is greater than the priority 1513b of support ticket 1514b, and may start a chat session 1507 that is associated with the support ticket 1506a. The chat session may be associated with the customer 1510a with computing device 1508a and the support agent 1510b with computing device 1508b.

In some embodiments, the server 1501 in FIG. 15 can include components or functionality of the server 101 as described with respect to FIG. 1. In some embodiments, the database 1502 in FIG. 15 can include components or functionality of the database 102 as described with respect to FIG. 1. In some embodiments, the memory 1503 in FIG. 15 can include components or functionality of the memory 103 as described with respect to FIG. 1. In some embodiments, the list 1504 of support tickets in FIG. 15 can include components or functionality of the list 104 of support tickets as described with respect to FIG. 1. In some embodiments, the service board 1511 in FIG. 15 can include components or functionality of the service board 111 as described with respect to FIG. 1. In some embodiments, the list 1512 of support tickets in FIG. 15 can include components or functionality of the list 112 of support tickets as described with respect to FIG. 1. In some embodiments, the computing devices 1508a-c in FIG. 15 can include components or functionality of the computing devices 108a-c as described with respect to FIG. 1. In some embodiments, the customer 1510a in FIG. 15 can include components or functionality of the customers 110a-b as described with respect to FIG. 1. In some embodiments, the support agents 1510b-c in FIG. 15 can include components or functionality of the support agent 110c as described with respect to FIG. 1. In some embodiments, the chat session 1507 in FIG. 15 can include components or functionality of the chat session 107 as described with respect to FIG. 1. In some embodiments, the statuses 1509a-b in FIG. 15 can include components or functionality of the statuses 109a-b as described with respect to FIG. 1.

Figure 16:
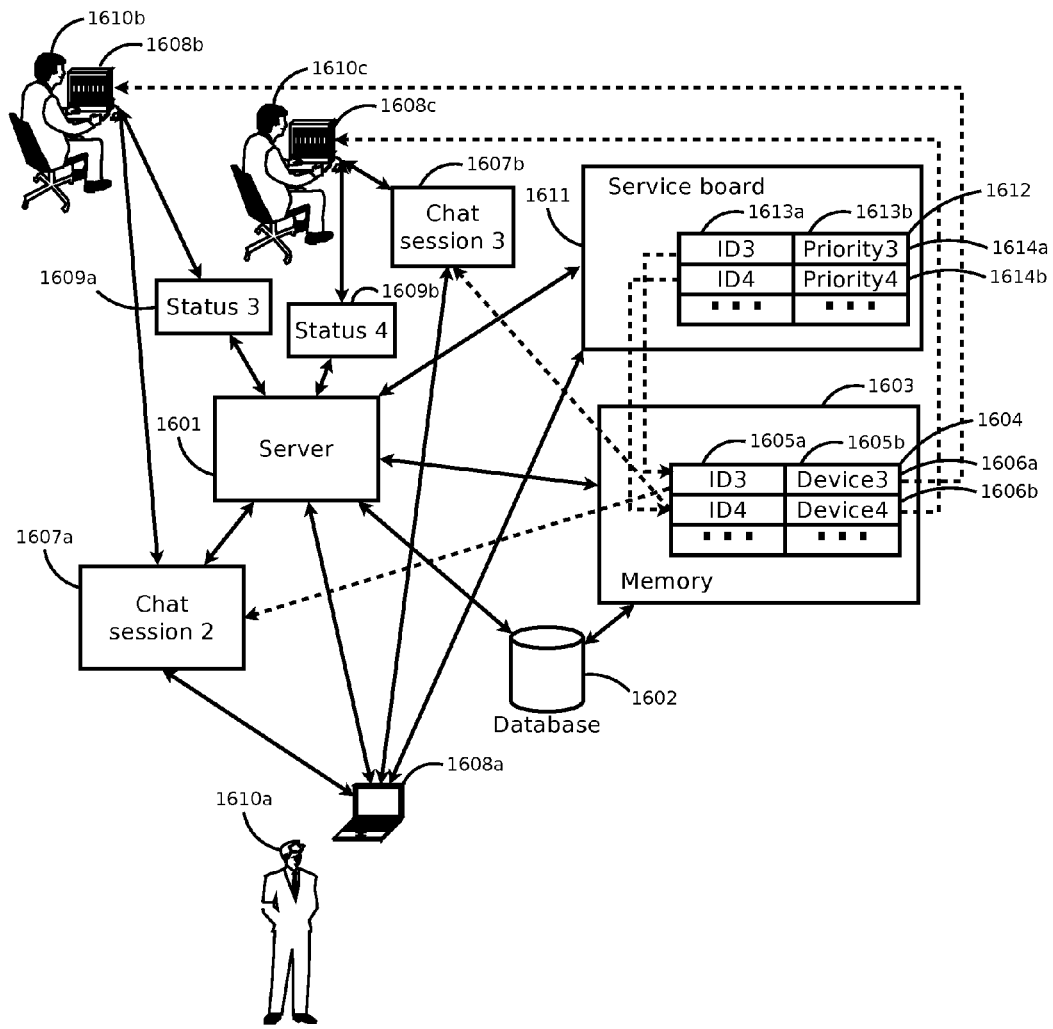
FIG. 16 is an illustrative block diagram of an embodiment of a customer starting a second chat session with a support agent.

FIG. 16 is an illustrative block diagram of an embodiment of a customer starting a second chat session with a support agent. The server 1601 can access the database 1602 and retrieve, into memory 1603, a list 1604 of support tickets 1606a, 1606b, and so on. Each support ticket 1606a-b can have an identifier 1605a and an association 1605b to a computing device. For example, in the embodiment depicted in FIG. 16, the support ticket 1606a is associated with computing device 1608b, and the support ticket 1606b is associated with computing device 1608c. The server 1601 can create a service board 1611 with a list 1612 of support tickets 1614a, 1614b, and so on. Each support ticket 1614a-b can have an identifier 1613a and a priority 1613b. The identifier 1613a can be used to associate the support tickets 1614a-b on the service board 1611 with the support tickets 1606a-b in memory 1603. For example, in the embodiment depicted in FIG. 16, the support ticket 1614a is associated with the support ticket 1606a, and the support ticket 1614b is associated with the support ticket 1606b.

Computing devices 1608b-c may be used by support agents 1610b-c, and computing device 1608a can be used by a customer 1610a. Computing device 1608b can generate a status 1609a, and computing device 1608c can generate a status 1609b. The server 1601 can use status 1609a to compute the priority 1613b of support ticket 1614a, which is associated with support ticket 1606a, which is in turn associated with computing device 1608b. Similarly, the server 1601 can use status 1609b to compute the priority 1613b of support ticket 1614b, which is associated with support ticket 1606b, which is in turn associated with computing device 1608c. The server 1601 may determine that the priority 1613b of support ticket 1614a is greater than the priority 1613b of support ticket 1614b, and may start a chat session 1607a that is associated with the support ticket 1606a. The chat session may be associated with the customer 1610a with computing device 1608a and the support agent 1610b with computing device 1608b.

The status 1609b of computing device 1608c may change to a new value. The server 1601 may use this new status 1609b to compute a new value for the priority 1613b of support ticket 1614b. The server 1601 may determine that the priority 1613b of support ticket 1614b is now greater than the priority 1613b of support ticket 1614a, and may start a second chat session 1607b that is associated with the support ticket 1606b. The chat session 1607b may be associated with the support agent 1610c with computing device 1608c and the customer 1610a with computing device 1608a.

In some embodiments, the server 1601 in FIG. 16 can include components or functionality of the server 101 as described with respect to FIG. 1. In some embodiments, the database 1602 in FIG. 16 can include components or functionality of the database 102 as described with respect to FIG. 1. In some embodiments, the memory 1603 in FIG. 16 can include components or functionality of the memory 103 as described with respect to FIG. 1. In some embodiments, the list 1604 of support tickets in FIG. 16 can include components or functionality of the list 104 of support tickets as described with respect to FIG. 1. In some embodiments, the service board 1611 in FIG. 16 can include components or functionality of the service board 111 as described with respect to FIG. 1. In some embodiments, the list 1612 of support tickets in FIG. 16 can include components or functionality of the list 112 of support tickets as described with respect to FIG. 1. In some embodiments, the computing devices 1608a-c in FIG. 16 can include components or functionality of the computing devices 108a-c as described with respect to FIG. 1. In some embodiments, the customer 1610a in FIG. 16 can include components or functionality of the customers 110a-b as described with respect to FIG. 1. In some embodiments, the support agents 1610b-c in FIG. 16 can include components or functionality of the support agent 110c as described with respect to FIG. 1. In some embodiments, the chat sessions 1607a-b in FIG. 16 can include components or functionality of the chat session 107 as described with respect to FIG. 1. In some embodiments, the statuses 1609a-b in FIG. 16 can include components or functionality of the statuses 109a-b as described with respect to FIG. 1.

Figure 17:
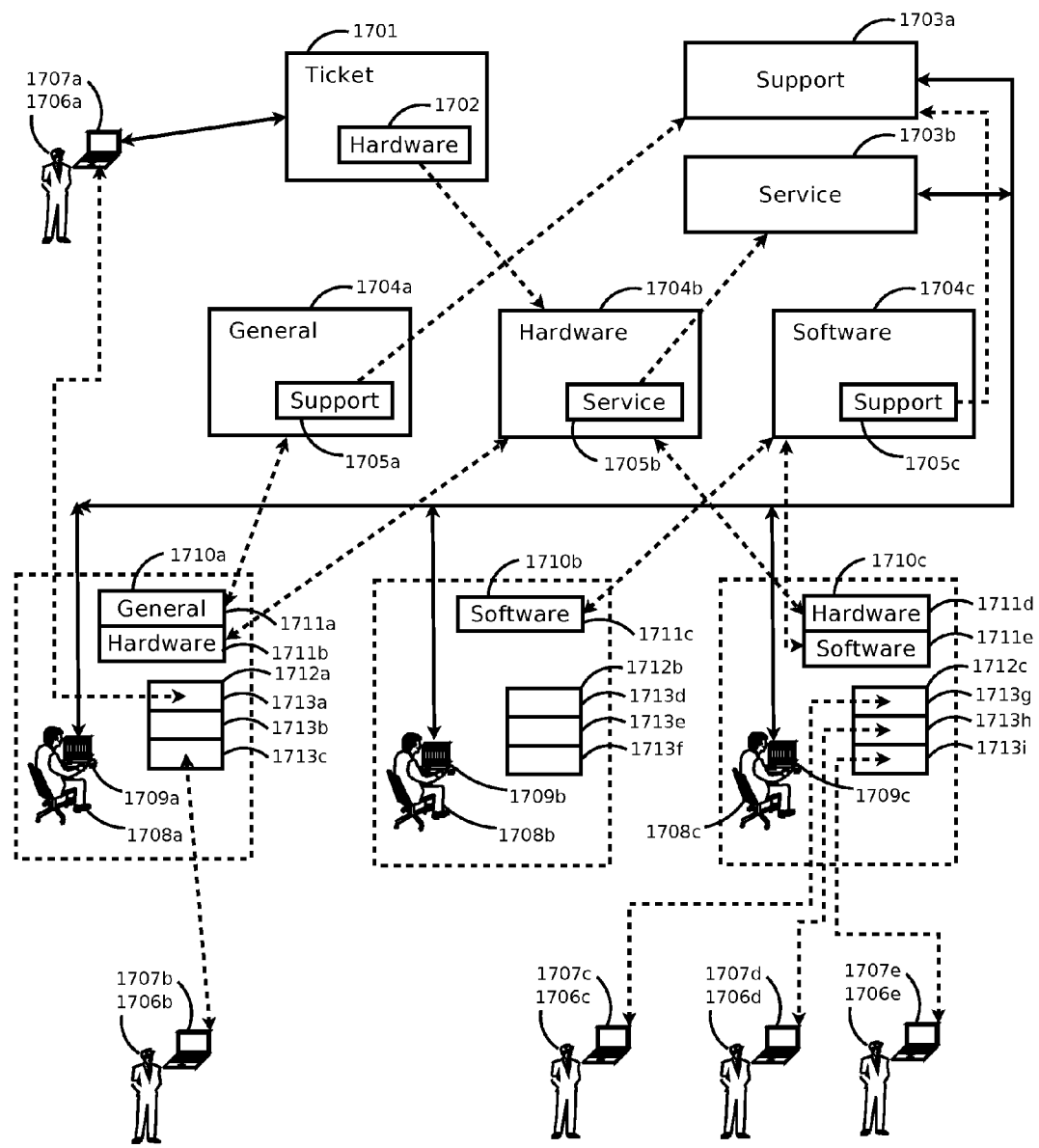
FIG. 17 is an illustrative block diagram of an embodiment of chat queues for managing chat sessions between support agents and customers.

FIG. 17 is an illustrative block diagram of an embodiment of chat queues for managing chat sessions between support agents and customers. Chat queues 1704a-c can be set up to manage incoming chat sessions. Each chat queue 1704a-c can be named and can have a reference 1705a-c to a service board 1703a-b. In the example embodiment of FIG. 17, chat queue 1704a is for General issues and has a reference 1705a to the Support service board 1703a, chat queue 1704b is for Hardware issues and has a reference 1705b to the Service service board 1703b, and chat queue 1704c is for Software issues and has a reference 1705c to the Support service board 1703a.

Each support agent 1708a-c with a computing device 1709a-c can join a list 1710a-c of chat queues, and can have a fixed size list 1712a-c of chat sessions. The support agents 1708a-c can access the service boards 1703a-b through their computing devices 1709a-c to manage support sessions. The size of the list 1712a-c can be maintained at a fixed size by using a count and a threshold as described with respect to FIG. 9. In the example embodiment depicted in FIG. 17, support agent 1708a with computing device 1709a has joined the list 1710a of chat queues with a reference 1711a to the General chat queue 1704a and a reference 1711b to the Hardware chat queue 1704b, support agent 1708b with computing device 1709b has joined the list 1710b of chat queues with a reference 1711c to the Software chat queue 1704c, and support agent 1708c with computing device 1709c has joined the list 1710c of chat queues with a reference 1711d to the Hardware chat queue 1704b and a reference 1711e to the Software chat queue 1704c. Continuing the example embodiment depicted in FIG. 17, support agent 1708a has two active chat sessions: 1713a with customer 1706a and computing device 1707a, and 1713c with customer 1706b and computing device 1707b; support agent 1708b has no active chat sessions; and support agent 1708c has three active chat sessions: 1713g-i with customers 1706c-e and computing devices 1706c-e. In the example embodiment depicted in FIG. 17, the limit on the number of chat sessions per support agent is set to three.

A customer 1706a can use a computing device 1707a to create a ticket 1701 for chat support. The customer 1706a can select a chat queue 1702 for the ticket. In the example embodiment depicted in FIG. 17, the customer 1706a selects 1702 the Hardware chat queue 1704b. Continuing the example embodiment depicted in FIG. 17, support agent 1708b has not joined the Hardware chat queue 1704b, and support agent 1708c is already working with the limit of three chat sessions 1713g-i, so support agent 1708a accepts the chat session 1713a with the customer 1706a, and uses the Service service board 1703b to work on the ticket 1701.

In some embodiments, the customers 1706a-e in FIG. 17 can include components or functionality of the customers 110a-b as described with respect to FIG. 1. In some embodiments, the support agents 1708a-c in FIG. 17 can include components or functionality of the support agent 110c as described with respect to FIG. 1. In some embodiments, the computing devices 1707a-e and 1709a-c in FIG. 17 can include components or functionality of the computing devices 108a-c as described with respect to FIG. 1. In some embodiments, the service boards 1703a-b in FIG. 17 can include components or functionality of the service board 111 as described with respect to FIG. 1. In some embodiments, the support ticket 1701 in FIG. 17 can include components or functionality of the support tickets 106a-b as described with respect to FIG. 1.

Figure 18:
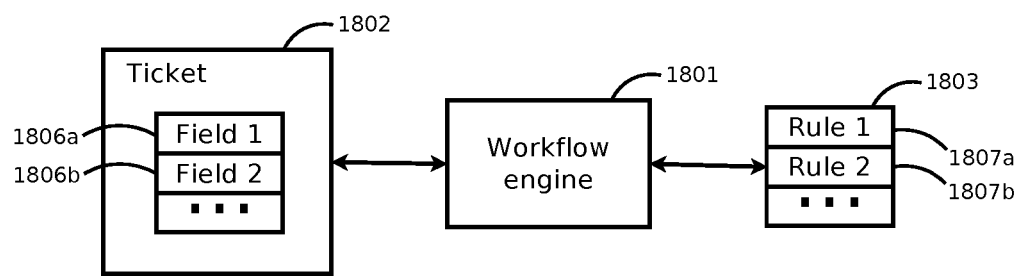
FIG. 18 is an illustrative block diagram of an embodiment of a workflow engine.

FIG. 18 is an illustrative block diagram of an embodiment of a workflow engine. The workflow engine 1801 can automate actions on a ticket 1802. The workflow engine 1801 can access a ticket 1802 to use the descriptive fields 1806a-b in the ticket 1802. The workflow engine can also access a list 1803 of workflow rules 1807a-b that can describe conditions to check for in the descriptive fields 1806a-b and changes to make to the ticket 1802 when the conditions are satisfied. For example, a workflow rule 1807a-b can be designed to find chat tickets that were entered more than 10 minutes previously, but have not started a chat session with a support agent. These may indicate that the customer may still be waiting, so the action may be to move the ticket to a service board that is monitored by a service manager and is designed to prevent customer dissatisfaction with long wait times for chats.

In some embodiments, the support ticket 1802 in FIG. 18 can include components or functionality of the support tickets 106a-b as described with respect to FIG. 1. In some embodiments, the descriptive fields 1806a-b in FIG. 18 can include components or functionality of the descriptive fields 1005c-e as described with respect to FIG. 10.

Figure 19A:
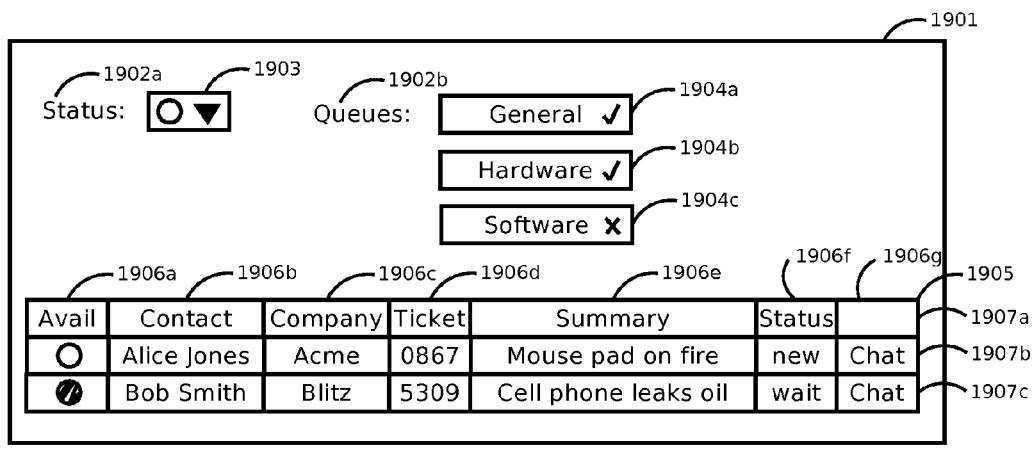
FIG. 19A is an illustrative example of an embodiment of a user interface for displaying a service board to a support agent.

FIG. 19A is an illustrative example of an embodiment of a user interface for displaying a service board to a support agent. The user interface 1901 can contain a status selection control 1903 that may allow the support agent to set the status associated with the computing device used by the support agent. The status selection control 1903 may have a label 1902a to facilitate finding and using the control. The user interface 1901 can contain a list of chat queues 1904a-c and a label 1902b to facilitate finding and using the queues. The chat queues 1904a-c may be selected to allow the support agent to join or not join the selected queue. In the example embodiment depicted in FIG. 19A, the support agent has joined the General queue 1904a and the Hardware queue 1904b, and has not joined the Software queue 1904c. The user interface 1901 can have a table 1905 of support tickets 1907b-c, with titles 1907a on the columns 1906a-g to facilitate understanding the table 1905. In the example embodiment depicted in FIG. 19A, the columns 1906a-g include a column 1906a that shows the status of the computing device of the customer associated with the ticket, a column 1906b that shows the name of the customer associated with the ticket, a column 1906c that shows the company name associated with the ticket, a column 1906d that shows the ticket number, a column 1906e that shows a brief summary of the ticket, a column 1906f that shows the status of the ticket, and a column 1906g with a button to initiate a chat session with the customer associated with the ticket.

Figure 19B:
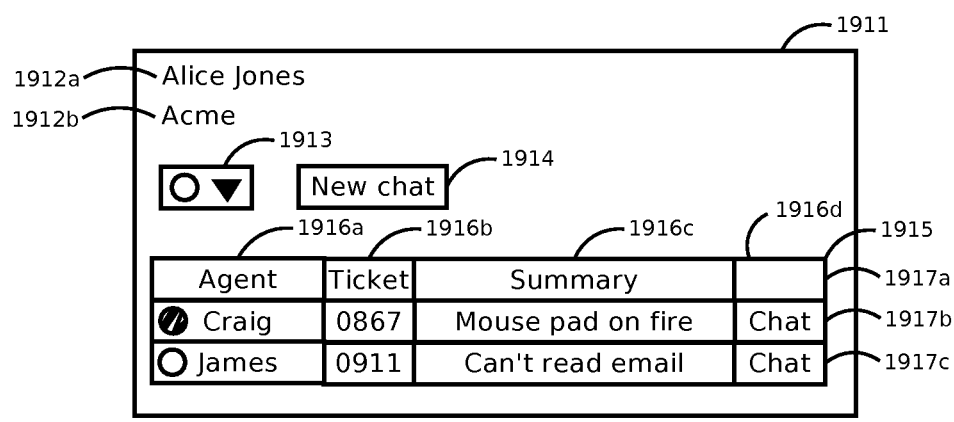
FIG. 19B is an illustrative example of an embodiment of a user interface for displaying a service board to a customer.

FIG. 19B is an illustrative example of an embodiment of a user interface for displaying a service board to a customer. The user interface 1911 can contain a status selection control 1913 that may allow the customer to set the status associated with the computing device used by the customer. The user interface 1911 can contain text labels 1912a-b to facilitate identifying the user interface 1911. In the example embodiment depicted in FIG. 19B, the text 1912a identifies the name of the customer that has signed in and the text 1912b identifies the name of the company where the customer is located. The user interface 1911 can contain a button 1914 to start a completely new chat. The user interface 1911 can have a table 1915 of support tickets 1917b-c, with titles 1917a on the columns 1916a-d to facilitate understanding the table 1915. In the example embodiment depicted in FIG. 19B, the columns 1916a-d include a column 1916a that shows the status of the computing device of the support agent associated with the ticket and the name of the support agent associated with the ticket, a column 1916b that shows the ticket number, a column 1916c that shows a brief summary of the ticket, and a column 1916d with a button to initiate a chat session with the support agent associated with the ticket.

Figure 20A:
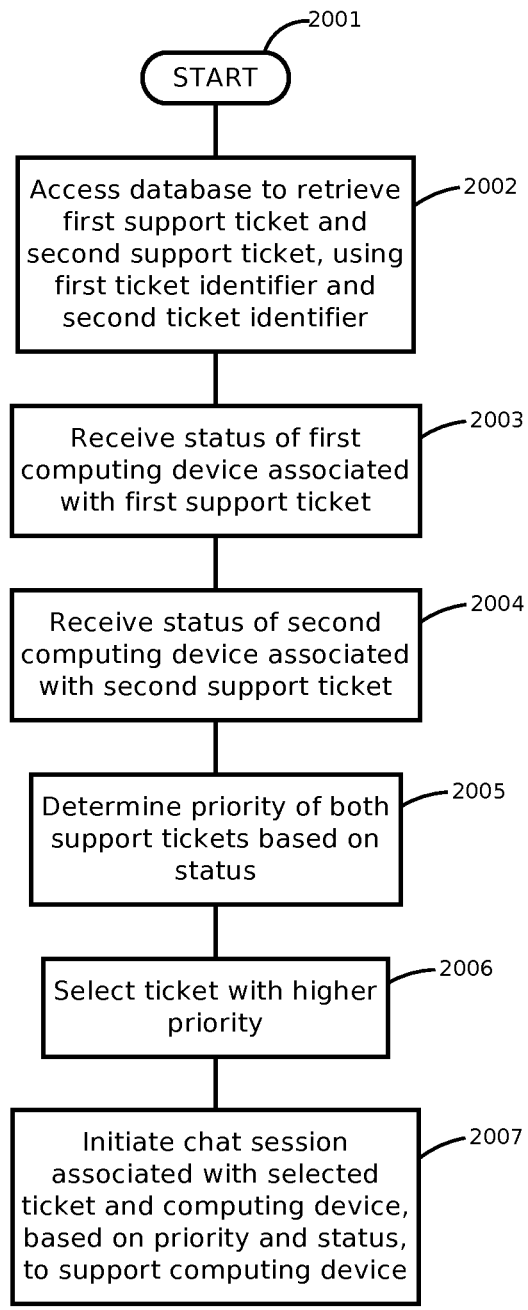
FIG. 20A is an illustrative flowchart depicting one embodiment of a method of prioritizing and servicing support tickets using a chat session.

FIG. 20A is an illustrative flowchart depicting one embodiment of a method of prioritizing and servicing support tickets using a chat session. The method 2001 can include accessing a database to retrieve a first support ticket and a second support ticket, using the first ticket identifier and the second ticket identifier (2002). The method 2001 can include receiving a status of a first computing device associated with the first support ticket (2003). The method 2001 can include receiving a status of a second computing device associated with the second support ticket (2004). The method 2001 can include determining the priority of both support tickets based on their status (2005). The method 2001 can include selecting the ticket with the higher priority (2006). The method 2001 can include initiating a chat session associated with the selected ticket and computing device, based on the priority of the ticket and the status of the device, to support the device (2007).

Figure 20B:
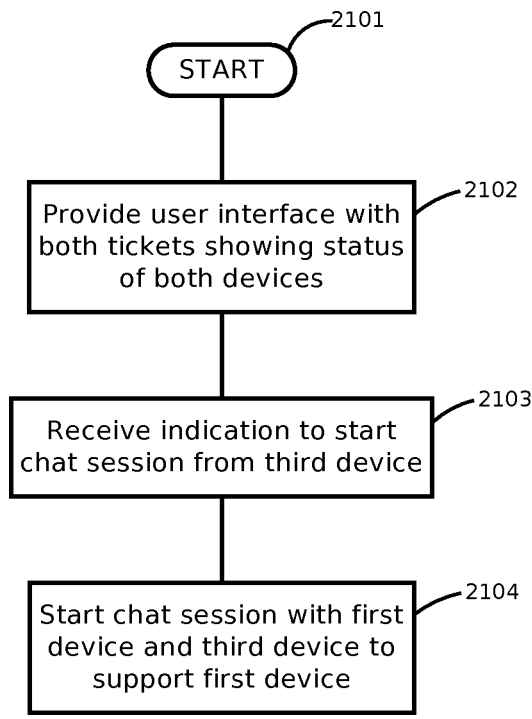
FIG. 20B is an illustrative flowchart depicting one embodiment of a method of responding to a user interface to service support tickets using a chat session.

FIG. 20B is an illustrative flowchart depicting one embodiment of a method of responding to a user interface to service support tickets using a chat session. The method 2101 can include providing a user interface displaying the first ticket, the second ticket, the first status of the first computing device, and the second status of the second computing device (2102). The method 2101 can include receiving an indication from the third computing device to start a chat session (2103). The method 2101 can include starting the chat session, associated with the first device and the third device, to support the first device (2104).

Figure 21:
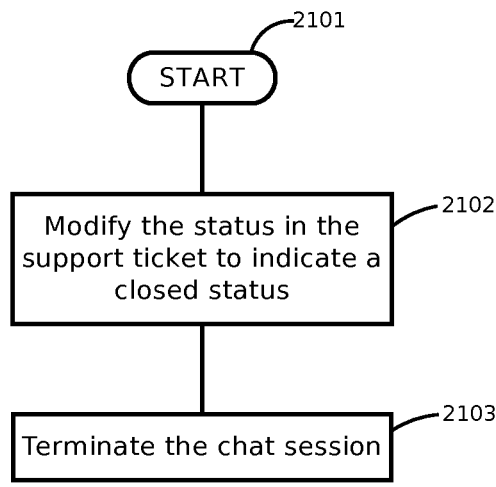
FIG. 21 is an illustrative flowchart depicting one embodiment of a method of closing a support ticket and terminating a chat session.

FIG. 21 is an illustrative flowchart depicting one embodiment of a method of closing a support ticket and terminating a chat session. The method 2101 can include modifying the status in the support ticket to indicate a closed status (2102). The method 2101 can include terminating the chat session (2103).

Figure 22:
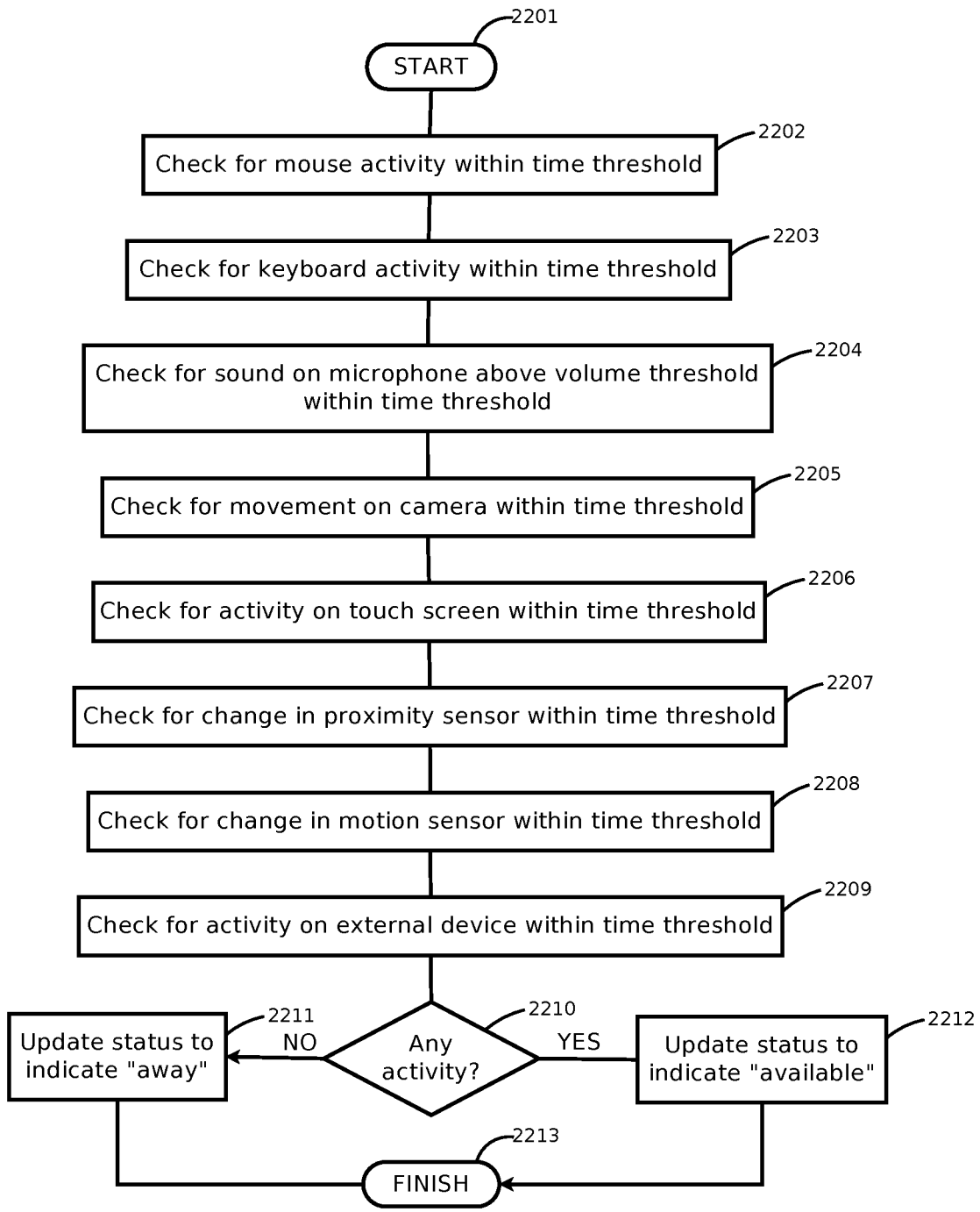
FIG. 22 is an illustrative flowchart depicting one embodiment of a method of automatically determining the status of a computing device based on activity.

FIG. 22 is an illustrative flowchart depicting one embodiment of a method of automatically determining the status of a computing device based on activity. The method 2201 can include checking for mouse activity within a time threshold (2202). The method 2201 can include checking for keyboard activity within the time threshold (2203). The method 2201 can include checking for sound detected by a microphone, above a volume threshold, within the time threshold (2204). The method 2201 can include checking for movement detected by a camera within the time threshold (2205). The method 2201 can include checking for activity on a touch screen within the time threshold (2206). The method 2201 can include checking for a change in a proximity sensor within the time threshold (2207). The method 2201 can include checking for a change in a motion sensor within the time threshold (2208). The method 2201 can include checking for activity on an external device within the time threshold (2209). The method 2201 can include checking whether any of the checks described above have returned a positive result (2210). In one embodiment, the method 2201 can include updating the device status to indicate that the user of the device is available (2212). In one embodiment, the method 2201 can include updating the device status to indicate that the user of the device is away (2211). The method 2201 can include joining a plurality of control flows (2213).

Figure 23:
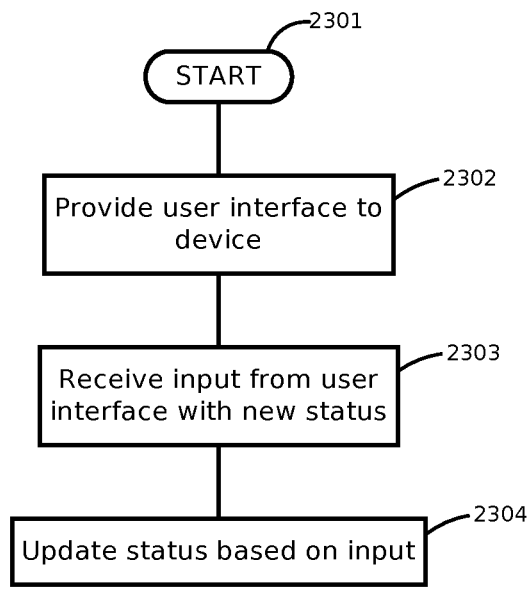
FIG. 23 is an illustrative flowchart depicting one embodiment of a method of using a user interface for setting the status of a computing device.

FIG. 23 is an illustrative flowchart depicting one embodiment of a method of using a user interface for setting the status of a computing device. The method 2301 can include providing a user interface to a device (2302). The method 2301 can include receiving input from the user interface with a new status (2303). The method 2301 can include updating the status based on the input (2304).

Figure 24:
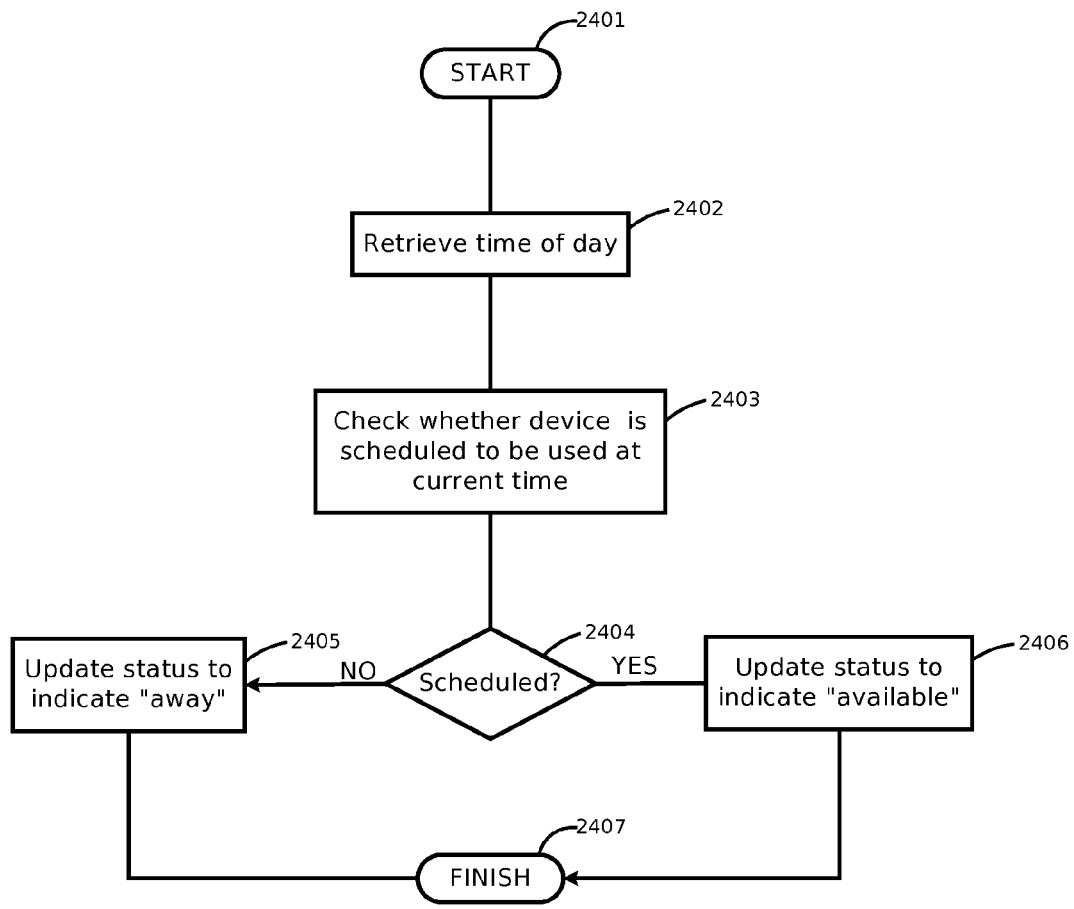
FIG. 24 is an illustrative flowchart depicting one embodiment of a method of automatically determining the status of a computing device based on the time of day.

FIG. 24 is an illustrative flowchart depicting one embodiment of a method of automatically determining the status of a computing device based on the time of day. The method 2401 can include retrieving the time of day (2402). The method 2401 can include checking whether a device is scheduled to be used at the current time (2403 and 2404). In some embodiments, the method 2401 can include updating the device status to indicate that the user of the device is available (2406). In some embodiments, the method 2401 can include updating the device status to indicate that the user of the device is away (2405). The method 2401 can include joining a plurality of control flows (2407).

Figure 25:
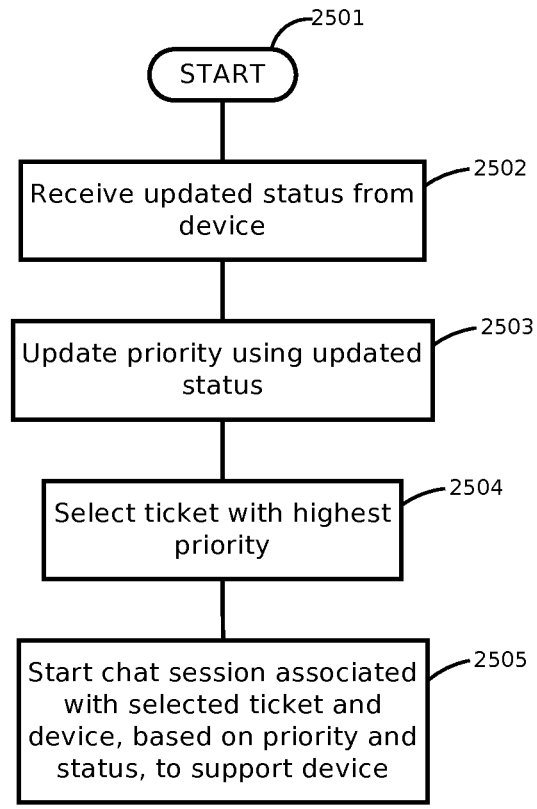
FIG. 25 is an illustrative flowchart depicting one embodiment of a method of updating the priority of a ticket based on a change in the status of a computing device.

FIG. 25 is an illustrative flowchart depicting one embodiment of a method of updating the priority of a ticket based on a change in the status of a computing device. The method 2501 can include receiving an updated status from a device (2502). The method 2501 can include updating the priority using the updated status (2503). The method 2501 can include selecting the ticket with the highest priority (2504). The method 2501 can include starting a chat session associated with the selected ticket and computing device, based on the priority of the ticket and the status of the device, to support the device (2505).

Figure 26:
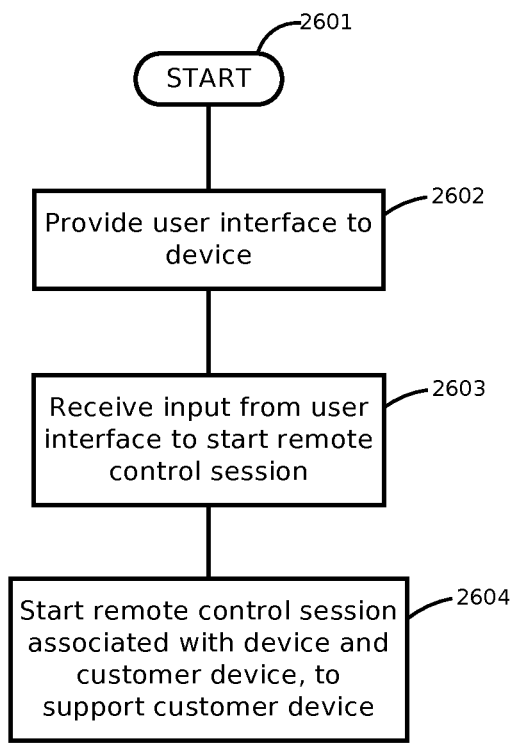
FIG. 26 is an illustrative flowchart depicting one embodiment of a method of starting a remote control session by a support agent.

FIG. 26 is an illustrative flowchart depicting one embodiment of a method of starting a remote control session by a support agent. The method 2601 can include providing a user interface to a device (2602). The method 2601 can include receiving input from the user interface to start a remote control session (2603). The method 2601 can include starting the remote control session associated with the device and the customer device, to support the customer device (2604).

Figure 27:
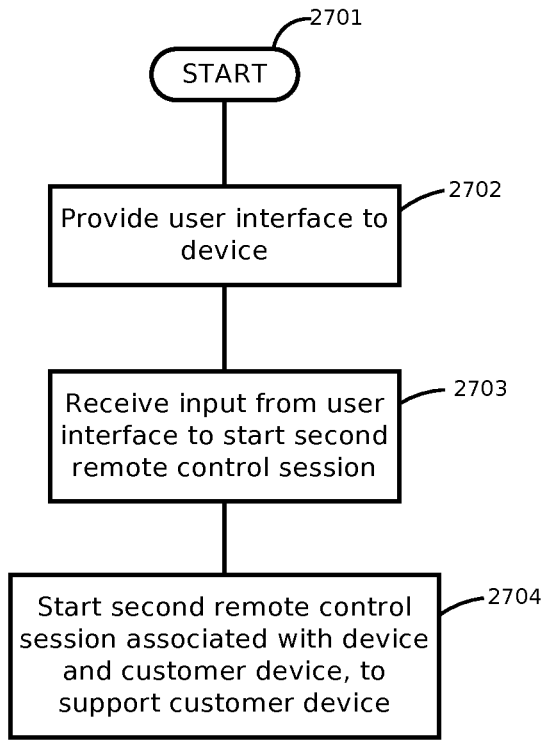
FIG. 27 is an illustrative flowchart depicting one embodiment of a method of starting a second remote control session by a support agent.

FIG. 27 is an illustrative flowchart depicting one embodiment of a method of starting a second remote control session by a support agent. The method 2701 can include providing a user interface to a device (2702). The method 2701 can include receiving input from the user interface to start a second remote control session (2703). The method 2701 can include starting the second remote control session associated with the device and the customer device, to support the customer device (2704).

Figure 28:
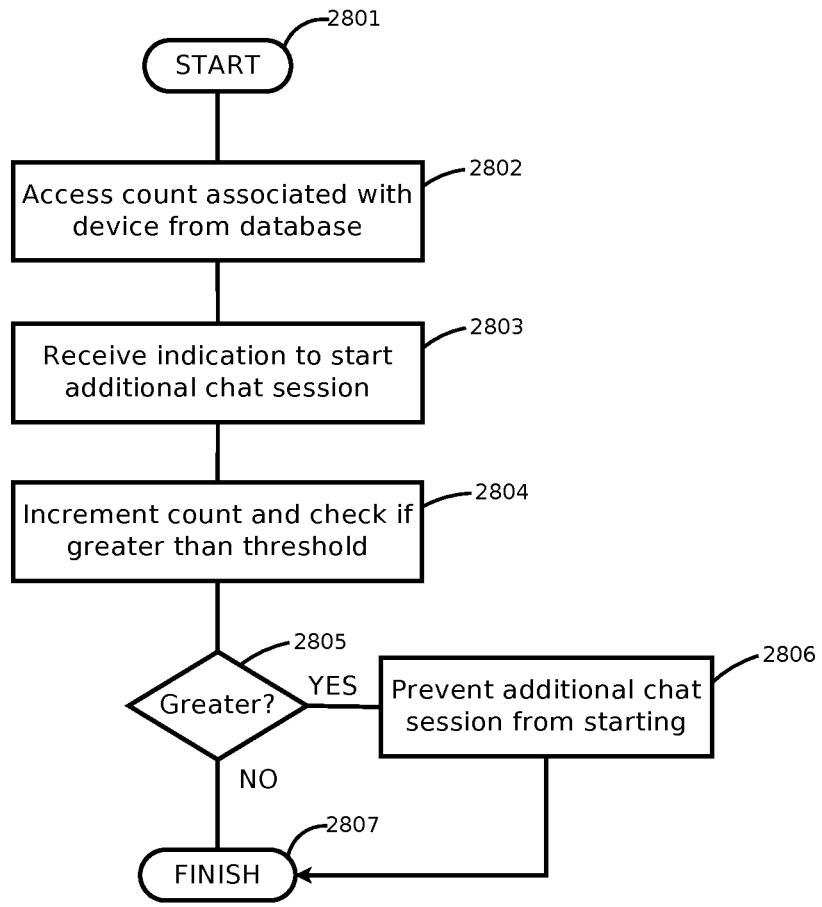
FIG. 28 is an illustrative flowchart depicting one embodiment of a method of limiting the number of chat sessions for a single support agent, based on a count.

FIG. 28 is an illustrative flowchart depicting one embodiment of a method of limiting the number of chat sessions for a single support agent, based on a count. The method 2801 can include accessing a count associated with the device from the database (2802). The method 2801 can include receiving an indication to start an additional chat session (2803). The method 2801 can include incrementing the count and checking if the count is greater than a threshold (2804 and 2805). In some embodiments, the method 2801 can include preventing the additional chat session from starting (2806). The method 2801 can include joining a plurality of control flows (2807).

Figure 29:
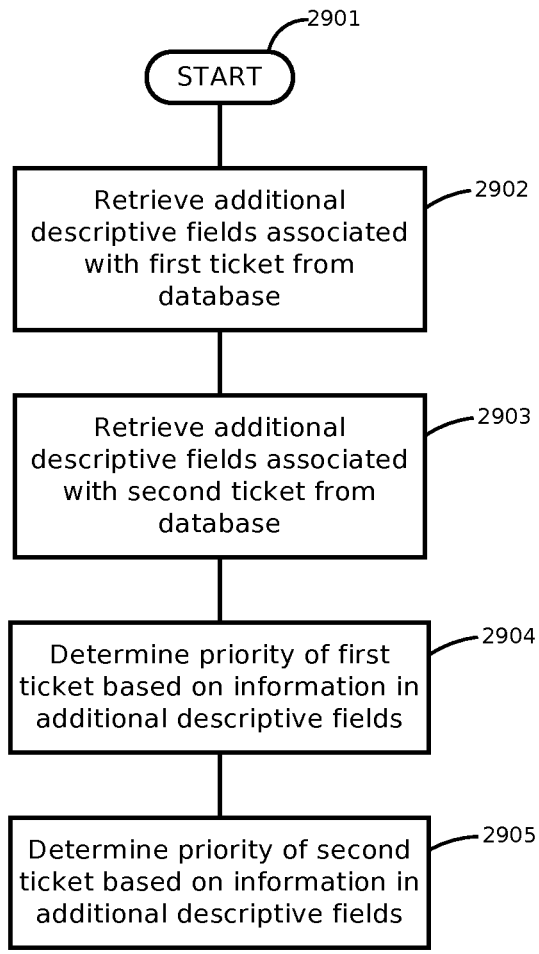
FIG. 29 is an illustrative flowchart depicting one embodiment of a method of using additional descriptive fields associated with a support ticket to prioritize the support ticket.

FIG. 29 is an illustrative flowchart depicting one embodiment of a method of using additional descriptive fields associated with a support ticket to prioritize the support ticket. The method 2901 can include retrieving additional descriptive fields associated with a first ticket from the database (2902). The method 2901 can include retrieving additional descriptive fields associated with a second ticket from the database (2903). The method 2901 can include determining the priority of the tickets based on information including the information from the additional descriptive fields (2904 and 2905).

Figure 30:
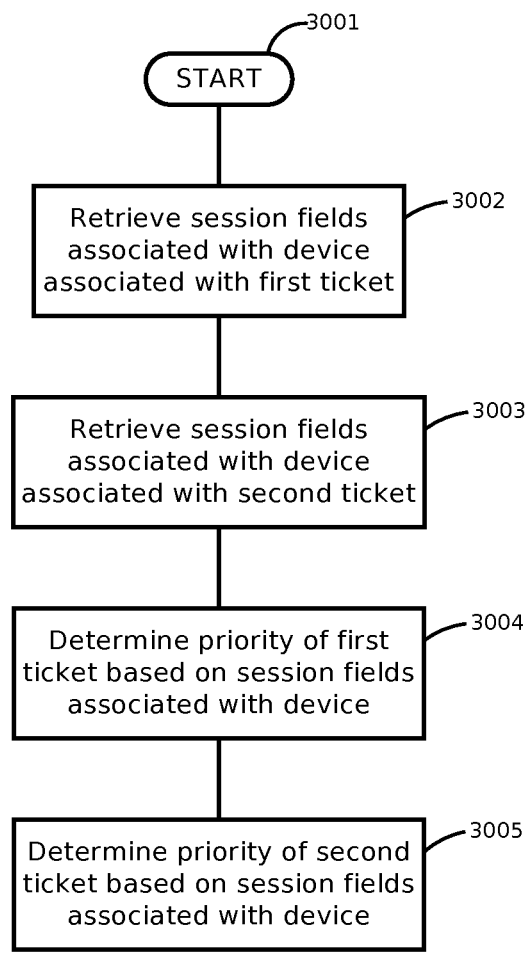
FIG. 30 is an illustrative flowchart depicting one embodiment of a method of using session information associated with computing devices to prioritize support tickets associated with the computing devices.

FIG. 30 is an illustrative flowchart depicting one embodiment of a method of using session information associated with computing devices to prioritize support tickets associated with the computing devices. The method 3001 can include retrieving session fields that are associated with the device that is associated with the first ticket (3002). The method 3001 can include retrieving session fields that are associated with device that is associated with the second ticket (3003). The method 3001 can include determining the priority of both tickets based on the session fields that are associated with the devices (3004 and 3005).

Figure 31:
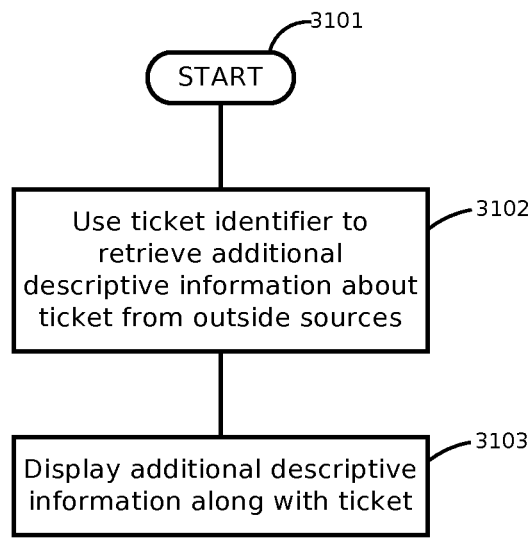
FIG. 31 is an illustrative flowchart depicting one embodiment of a method of using additional descriptive information associated with a support ticket from other sources.

FIG. 31 is an illustrative flowchart depicting one embodiment of a method of using additional descriptive information associated with a support ticket from other sources. The method 3101 can include using a ticket identifier to retrieve additional descriptive information about the ticket from multiple outside sources (3102). The method 3101 can include displaying additional descriptive information along with the ticket (3103).

Figure 32:
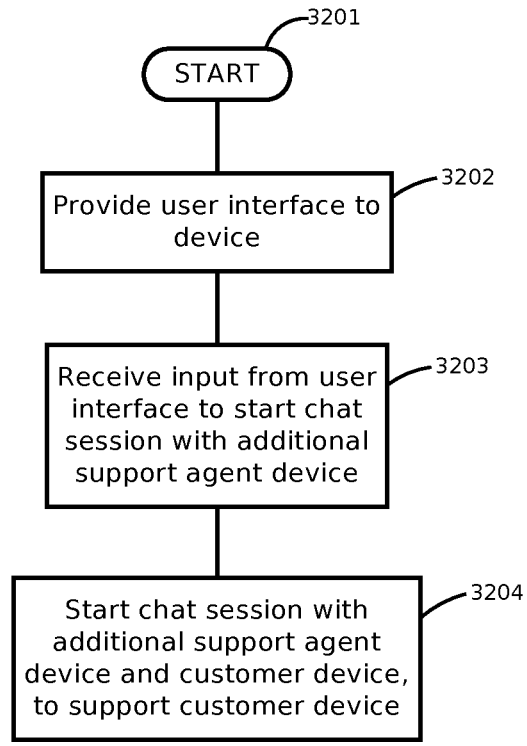
FIG. 32 is an illustrative flowchart depicting one embodiment of a method of adding a second support agent to a chat session with a customer.

FIG. 32 is an illustrative flowchart depicting one embodiment of a method of adding a second support agent to a chat session with a customer. The method 3201 can include providing a user interface to a device (3202). The method 3201 can include receiving input from the user interface to start a chat session with an additional support agent device (3203). The method 3201 can include starting the chat session with the additional support agent device and the customer device, to support the customer device (3204).

Figure 33:
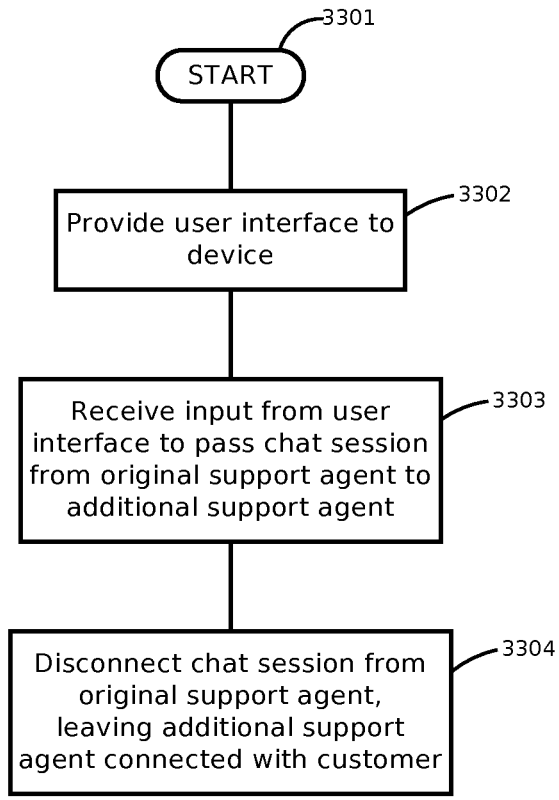
FIG. 33 is an illustrative flowchart depicting one embodiment of a method of passing a chat session with a customer from one support agent to another support agent.

FIG. 33 is an illustrative flowchart depicting one embodiment of a method of passing a chat session with a customer from one support agent to another support agent. The method 3301 can include providing a user interface to a device (3302). The method 3301 can include receiving input from the user interface to pass a chat session from the original support agent to a new support agent (3303). The method 3301 can include disconnecting the chat session from the original support agent, leaving the new support agent connected with the customer (3304).

Figure 34:
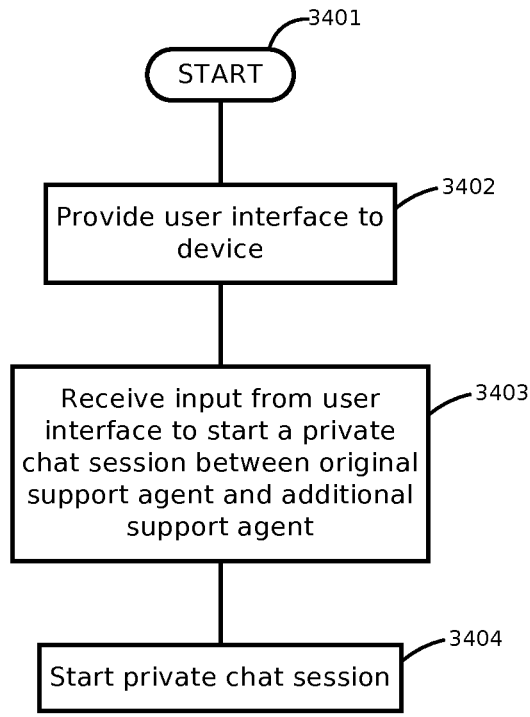
FIG. 34 is an illustrative flowchart depicting one embodiment of a method of starting a private chat session between two support agents working with a customer.

FIG. 34 is an illustrative flowchart depicting one embodiment of a method of starting a private chat session between two support agents working with a customer. The method 3401 can include providing a user interface to a device (3402). The method 3401 can include receiving input from the user interface to start a private chat session between the original support agent and the new support agent (3403). The method 3401 can include starting the private chat session (3404).

Figure 35:
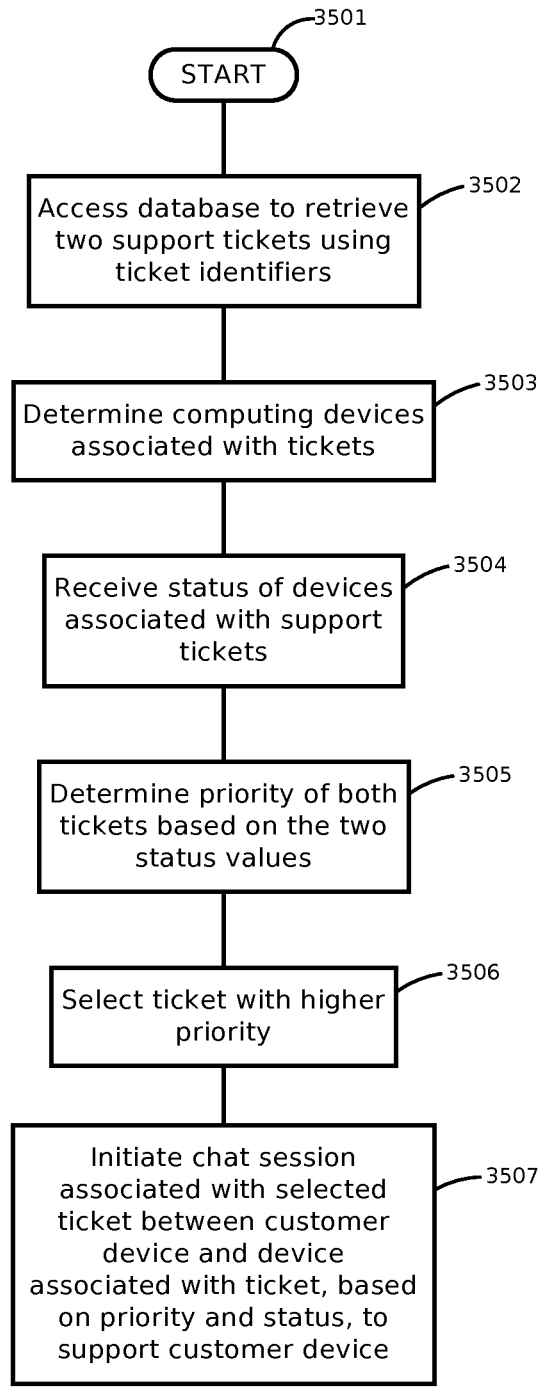
FIG. 35 is an illustrative flowchart depicting one embodiment of a method of prioritizing support tickets, by a customer, based on the status of computing devices associated with support agents, and starting a chat session, associated with a support ticket, with a support agent, based on the prioritization.

FIG. 35 is an illustrative flowchart depicting one embodiment of a method of prioritizing support tickets, by a customer, based on the status of computing devices associated with support agents, and starting a chat session, associated with a support ticket, with a support agent, based on the prioritization. The method 3501 can include accessing the database to retrieve two support tickets using their ticket identifiers (3502). The method 3501 can include determining the computing devices associated with the tickets (3503). The method 3501 can include receiving the status of the devices associated with the tickets (3504). The method 3501 can include determining the priority of both tickets based on the two status values (3505). The method 3501 can include selecting the ticket with the higher priority (3506). The method 3501 can include initiating a chat session associated with the selected ticket between the customer device and the device associated with the ticket, based on the priority of the ticket and the status of the device, to support the customer device (3507).

Figure 36:
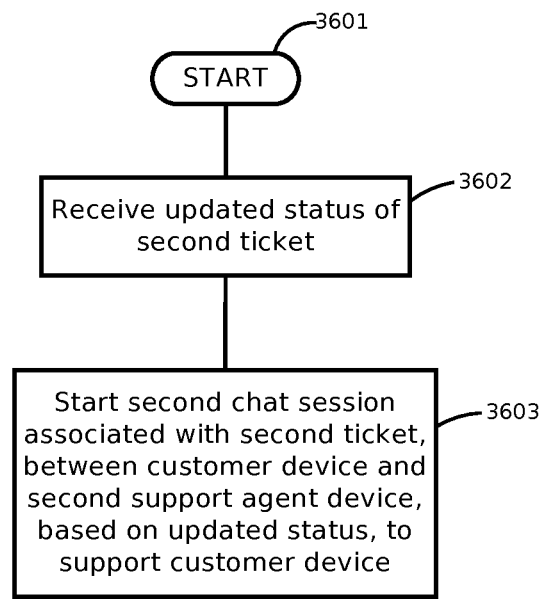
FIG. 36 is an illustrative flowchart depicting one embodiment of a method of starting, by a customer, a second chat session with a support agent.

FIG. 36 is an illustrative flowchart depicting one embodiment of a method of starting, by a customer, a second chat session with a support agent. The method 3601 can include receiving an updated status of a second ticket (3602). The method 3601 can include starting a second chat session associated with the second ticket, between the customer device and a second support agent device, based on the updated status, to support the customer device (3603).

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of servicing information technology tickets via a computer network, comprising:
    retrieving, by a server from a database stored in memory, a first ticket having a first ticket identifier, the first ticket having first information to facilitate providing information technology support or services to a first computing device;
    identifying, by the server, based on the first information, a first priority and a first chat queue for the first ticket;
    receiving, by the server, an update to the first information of the first ticket;
    determining, by the server responsive to the update to the first information, a second priority and a second chat queue for the first ticket, the second priority different from the first priority; and
    assigning, by the server, the first ticket to the second chat queue with the second priority to initiate a first chat session associated with the first ticket and the first computing device to provide information technology support or services to the first computing device.

2. The method of claim 1, further comprising:
    identifying, by the server, a second ticket in the second chat queue with a third priority;
    determining, by the server, that the third priority of the second ticket is greater less than the second priority of the first ticket; and
    initiating, by the server responsive to the determination, the first chat session associated with the first ticket and the first computing device.

3. The method of claim 1, further comprising:
    identifying, by the server, a second ticket in the second chat queue with a third priority less than the second priority; and
    establishing, by the server based on the second priority and the third priority, the second chat queue with the first chat session ahead of a second chat session associated with the second ticket.

4. The method of claim 1, further comprising:
    assigning the first ticket to the second chat queue responsive to the second priority being greater than the first priority.

5. The method of claim 1, further comprising:
    receiving, by the server from the first computing device associated with the first ticket, a first indication of a first status of the first computing device; and
    determining, by the server, the first priority of the first ticket based on the first status.

6. The method of claim 5, further comprising:
    receiving, by the server from the first computing device associated with the first ticket, a second indication of a second status of the first computing device; and
    determining, by the server, the second priority of the first support ticket based on the second status, the second priority greater than the first priority; and
    assigning, by the server, the second priority to the first ticket.

7. The method of claim 1, further comprising:
    receiving, by the server from the first computing device associated with the first ticket, a first indication of interaction with one or more input devices of the first computing device, the first indication associated with a timestamp;
    identifying, by the server, a current time;
    determining, by the server, a time interval between the current time and the timestamp of the first indication, wherein the server has not received a subsequence subsequent indication of interaction with the one or more input devices of the first computing device during the time interval;
    comparing, by the server, the time interval with a threshold to determine that the time interval is greater than or equal to the threshold;
    setting, based on the comparison, a first status of the first computing device to indicate that a user of the first computing device is away; and
    assigning, by the server, the first priority to the first ticket based on the first status.

8. The method of claim 7, further comprising:
    receiving, by the server subsequent to the time interval, a second indication of interaction with the one or more input devices of the first computing devices; and
    setting, by the server, the second status responsive to the second indication, the second status indicating that the user of the first computing device is present.

9. The method of claim 1, further comprising:
    determining at least one of the first priority or the second priority based on at least one of a microphone, a camera, a proximity sensor, or a position sensing system.

10. The method of claim 1, further comprising:
    receiving, by the server from a second computing device, an indication to initiate a remote control session to support the first computing device in accordance with the first ticket; and
    initiating, by the server responsive to the indication, the remote control session between the second computing device and the first computing device.

11. The method of claim 10, further comprising:
    monitoring, via the remote control session, outputs of the first computing device; and
    controlling, via the remote control session, an input device of the first computing device to support the first computing device in accordance with the first ticket.

12. The method of claim 1, further comprising:
    receiving, by the server from a monitoring system, activity information of the first computing device; and
    updating, by the server, the first ticket with the activity information.

13. The method of claim 1, further comprising:
    initiating, by the server, the first chat session associated with the first ticket and the first computing device, the first chat session initiated between the first computing device and a second computing device;

identifying, by the server, a second ticket associated with the first computing device, the second ticket having second information to facilitate providing information technology support or services to the first computing device; and initiating, by the server, a second chat session associated with the second ticket and the first computing device, the second chat session between the first computing device and a third computing device, the second chat session at least partially overlapping with the first chat session.

14. The method of claim 1, further comprising:
initiating, by the server, the first chat session associated with the first ticket and the first computing device, the first chat session initiated between the first computing device and a second computing device; and
adding, by the server, a third computing device to the first chat session, the first chat session configured to display messages from each of the first computing device, second computing device and third computing device to participants of the first chat session.

15. The method of claim 1, further comprising:
receiving, by a workflow engine executing on the server, the first ticket;
applying, by the work flow engine, a rule to the first information of the first ticket;
determining, based on the applying the rule, that the first ticket satisfies a condition associated with the rule; and
assigning, by the work flow engine, the first ticket to the second chat queue responsive to determining that the first ticket satisfies the condition.

16. A system for servicing information technology tickets via a computer network, comprising:
a server including a processor and memory configured to:
retrieve, from a database stored in the memory, a first ticket having a first ticket identifier, the first ticket having first information to facilitate providing information technology support or services to a first computing device;
identify, based on the first information, a first priority and a first chat queue for the first ticket;
receive an update to the first information of the first ticket;
determine, responsive to the update to the first information, a second priority and a second chat queue for the first ticket, the second priority greater than the first priority; and
assign the first ticket to the second chat queue with the second priority to initiate a first chat session associated with the first ticket and the first computing device to provide information technology support or services to the first computing device.

17. The system of claim 16, wherein the server is further configured to:
identify a second ticket in the second chat queue with a third priority;
determine that the third priority of the second ticket is less than the second priority of the first ticket; and
initiate, responsive to the determination, the first chat session associated with the first ticket and the first computing device.

18. The system of claim 16, wherein the server is further configured to:
identify a second ticket in the second chat queue with a third priority less than the second priority; and establish, based on the second priority and the third priority, the second chat queue with the first chat session ahead of a second chat session associated with the second ticket.

19. The system of claim 16, wherein the server is further configured to:
assign the first ticket to the second chat queue responsive to the second priority being greater than the first priority.

20. The system of claim 16, wherein the server is further configured to:
receive, from the first computing device associated with the first ticket, a first indication of a first status of the first computing device; and
determine the first priority of the first ticket based on the first status.

21. The system of claim 20, wherein the server is further configured to:
receive, from the first computing device associated with the first ticket, a second indication of a second status of the first computing device; and
determine the second priority of the first support ticket based on the second status, the second priority greater than the first priority; and
assigning, by the server, the second priority to the first ticket.

22. The system of claim 16, wherein the server is further configured to:
receive, from the first computing device associated with the first ticket, a first indication of interaction with one or more input devices of the first computing device, the first indication associated with a timestamp;
identify a current time;
determine a time interval between the current time and the timestamp of the first indication, wherein the server has not received a subsequent indication of interaction with the one or more input devices of the first computing device during the time interval;
compare the time interval with a threshold to determine that the time interval is greater than or equal to the threshold;
set, based on the comparison, a first status of the first computing device to indicate that a user of the first computing device is away; and
assign the first priority to the first ticket based on the first status.

23. The system of claim 22, wherein the server is further configured to:
receive, subsequent to the time interval, a second indication of interaction with the one or more input devices of the first computing devices; and
set the second status responsive to the second indication, the second status indicating that the user of the first computing device is present.

24. The system of claim 16, wherein the server is further configured to:
determine at least one of the first priority or the second priority based on at least one of a microphone, a camera, a proximity sensor, or a position sensing system.

25. The system of claim 16, wherein the server is further configured to:
receive, from a second computing device, an indication to initiate a remote control session to support the first computing device in accordance with the first ticket; and
initiate, responsive to the indication, the remote control session between the second computing device and the first computing device.

26. The system of claim 25, wherein the server is further configured to:
  monitor, via the remote control session, outputs of the first computing device; and
  control, via the remote control session, an input device of the first computing device to support the first computing device in accordance with the first ticket.

27. The system of claim 16, wherein the server is further configured to:
  receive, from a monitoring system, activity information of the first computing device; and
  update the first ticket with the activity information.

28. The system of claim 16, wherein the server is further configured to:
  initiate the first chat session associated with the first ticket and the first computing device, the first chat session initiated between the first computing device and a second computing device;
  identify a second ticket associated with the first computing device, the second ticket having second information to facilitate providing information technology support or services to the first computing device; and
  initiate a second chat session associated with the second ticket and the first computing device, the second chat session between the first computing device and a third computing device, the second chat session at least partially overlapping with the first chat session.

29. The system of claim 16, wherein the server is further configured to:
  initiate the first chat session associated with the first ticket and the first computing device, the first chat session initiated between the first computing device and a second computing device; and
  add a third computing device to the first chat session, the first chat session configured to display messages from each of the first computing device, second computing device and third computing device to participants of the first chat session.

30. The system of claim 16, further comprising a workflow engine configured on the server to:
  receive the first ticket;
  apply a rule to the first information of the first ticket;
  determine, based on the application of the rule, that the first ticket satisfies a condition associated with the rule; and
  assign the first ticket to the second chat queue responsive to the determination that the first ticket satisfies the condition.

* * * * *